(12) United States Patent
Hopkins

(10) Patent No.: US 8,419,348 B2
(45) Date of Patent: Apr. 16, 2013

(54) FAN ARRAY FAN SECTION IN AIR-HANDLING SYSTEMS

(75) Inventor: Lawrence G. Hopkins, Portland, OR (US)

(73) Assignee: Huntair, Inc., Tualatin, OR (US)

( * ) Notice: Subject to any disclaimer, the term of this patent is extended or adjusted under 35 U.S.C. 154(b) by 0 days.

(21) Appl. No.: 13/080,168

(22) Filed: Apr. 5, 2011

(65) Prior Publication Data

US 2011/0212679 A1    Sep. 1, 2011

Related U.S. Application Data

(63) Continuation of application No. 11/982,233, filed on Oct. 31, 2007, now Pat. No. 7,922,442, which is a continuation of application No. 11/595,212, filed on Nov. 9, 2006, now Pat. No. 7,527,468, which is a continuation-in-part of application No. 10/806,775, filed on Mar. 22, 2004, now Pat. No. 7,137,775, which is a continuation-in-part of application No. PCT/US2004/008578, filed on Mar. 19, 2004.

(60) Provisional application No. 60/456,413, filed on Mar. 20, 2003, provisional application No. 60/554,702, filed on Mar. 20, 2004.

(51) Int. Cl.
 *F04D 25/08* (2006.01)

(52) U.S. Cl.
 USPC ................ 415/61; 415/119; 415/30; 415/1; 416/130

(58) Field of Classification Search ............ 415/61, 415/119, 1, 120; 416/120, 130; 417/3, 423.5, 417/426; 454/338; 361/695
See application file for complete search history.

(56) References Cited

U.S. PATENT DOCUMENTS

| | | | |
|---|---|---|---|
| 1,517,764 A | 2/1924 | Still | |
| 1,493,497 A | 5/1924 | Otis | |
| 2,108,738 A | 2/1938 | Allen | |
| 2,175,641 A | 10/1939 | Replogle | |
| 2,300,475 A | 3/1942 | Ward | |
| 2,634,048 A * | 4/1953 | McDonald | 415/60 |

(Continued)

FOREIGN PATENT DOCUMENTS

| | | |
|---|---|---|
| DE | 3603433 | 8/1986 |
| DE | 19719507 A1 | 11/1998 |

(Continued)

OTHER PUBLICATIONS

Governair Corporation Case Study; Postal Distribution Center; 4 pages; May 30, 2002.

(Continued)

*Primary Examiner* — Ninh H Nguyen

(74) *Attorney, Agent, or Firm* — The Small Patent Law Group; Dean D. Small

(57) ABSTRACT

A fan array fan section in an air-handling system includes a plurality of fan units arranged in a fan array and positioned within an air-handling compartment. One preferred embodiment may include an array controller programmed to operate the plurality of fan units at peak efficiency. The plurality of fan units may be arranged in a true array configuration, a spaced pattern array configuration, a checker board array configuration, rows slightly offset array configuration, columns slightly offset array configuration, or a staggered array configuration.

52 Claims, 21 Drawing Sheets

U.S. PATENT DOCUMENTS

| | | |
|---|---|---|
| 2,901,959 A | 9/1959 | Kinney |
| 3,096,933 A | 7/1963 | Bora |
| 3,156,233 A | 11/1964 | O'Connell |
| 3,175,586 A | 3/1965 | Tatsch |
| 3,254,830 A | 6/1966 | Wallin |
| 3,332,621 A | 7/1967 | Tanner |
| 3,398,880 A | 8/1968 | Wallin |
| 3,530,683 A | 9/1970 | Watkins |
| 3,851,726 A | 12/1974 | Grose |
| 3,858,676 A * | 1/1975 | Le Masurier ............... 181/286 |
| 3,898,019 A | 8/1975 | Reznick et al. |
| 3,947,148 A | 3/1976 | Holt |
| 4,021,213 A | 5/1977 | Neidhardt et al. |
| 4,106,076 A | 8/1978 | Miller |
| 4,133,374 A | 1/1979 | York |
| 4,139,052 A | 2/1979 | Lackey |
| 4,158,527 A | 6/1979 | Burkett |
| 4,174,020 A | 11/1979 | Challis |
| 4,239,020 A | 12/1980 | Kiyokawa |
| 4,239,571 A | 12/1980 | Cobb et al. |
| 4,241,871 A | 12/1980 | Newell, III et al. |
| 4,392,417 A | 7/1983 | Johannsen |
| 4,426,960 A | 1/1984 | Hart |
| 4,494,006 A | 1/1985 | Staroselsky et al. |
| 4,497,242 A | 2/1985 | Moyer |
| 4,508,486 A | 4/1985 | Tinker |
| 4,548,292 A | 10/1985 | Nixon |
| 4,549,472 A | 10/1985 | Endo et al. |
| 4,584,232 A | 4/1986 | Frank et al. |
| 4,615,411 A | 10/1986 | Breitscheidel et al. |
| 4,648,007 A | 3/1987 | Garner |
| 4,651,922 A | 3/1987 | Noba |
| 4,687,691 A | 8/1987 | Kay |
| 4,700,887 A | 10/1987 | Timmons |
| 4,734,323 A | 3/1988 | Sato et al. |
| 4,750,860 A | 6/1988 | Kelley |
| 4,764,238 A | 8/1988 | Dastin et al. |
| 4,767,262 A | 8/1988 | Simon |
| 4,780,167 A | 10/1988 | Hill |
| 4,800,653 A | 1/1989 | Steffen |
| 4,807,718 A | 2/1989 | Lotz |
| 4,925,719 A | 5/1990 | Staneluis et al. |
| 4,966,799 A | 10/1990 | Lucca et al. |
| 5,009,043 A | 4/1991 | Kurrasch |
| 5,057,176 A | 10/1991 | Bainbridge |
| 5,058,491 A | 10/1991 | Wiemer et al. |
| 5,069,113 A | 12/1991 | Mattson |
| 5,073,429 A | 12/1991 | Steinke et al. |
| 5,088,886 A | 2/1992 | Hopkins |
| 5,095,811 A | 3/1992 | Shutic |
| 5,135,073 A | 8/1992 | Nelson |
| 5,136,465 A | 8/1992 | Benck et al. |
| 5,153,073 A | 10/1992 | Ohnuma et al. |
| 5,192,348 A | 3/1993 | Ludwig |
| 5,207,614 A | 5/1993 | Passadore |
| 5,210,680 A | 5/1993 | Scheibler |
| 5,211,988 A | 5/1993 | Morton |
| 5,230,604 A | 7/1993 | Glaser |
| 5,258,585 A | 11/1993 | Jurigas |
| 5,269,660 A | 12/1993 | Pradelle |
| 5,297,990 A * | 3/1994 | Renz et al. ............... 454/187 |
| 5,370,576 A | 12/1994 | Krofchalk |
| 5,379,806 A | 1/1995 | Matthews |
| 5,417,433 A | 5/1995 | Phillips |
| 5,426,268 A | 6/1995 | Yazici |
| 5,454,756 A | 10/1995 | Ludwig |
| 5,462,484 A | 10/1995 | Jung et al. |
| 5,467,250 A | 11/1995 | Howard |
| 5,487,412 A | 1/1996 | Matthews |
| 5,492,082 A | 2/1996 | Krevinghaus |
| 5,493,081 A | 2/1996 | Manigold |
| 5,536,556 A | 7/1996 | Juriga |
| 5,544,012 A | 8/1996 | Koike |
| 5,546,272 A | 8/1996 | Moss et al. |
| 5,569,023 A * | 10/1996 | Ishida et al. ............... 417/326 |
| 5,572,403 A | 11/1996 | Mills |
| 5,586,861 A | 12/1996 | Berger |
| 5,586,932 A * | 12/1996 | Kiser ............... 454/229 |
| 5,611,504 A | 3/1997 | Haynes et al. |
| 5,613,759 A | 3/1997 | Ludwig et al. |
| 5,632,677 A | 5/1997 | Elkins |
| 5,664,995 A | 9/1997 | O'Keefe |
| 5,681,143 A | 10/1997 | Ratner |
| 5,701,750 A | 12/1997 | Ray |
| 5,719,200 A | 2/1998 | Staendeke |
| 5,720,274 A | 2/1998 | Brunner et al. |
| 5,745,041 A | 4/1998 | Moss |
| 5,787,971 A | 8/1998 | Dodson |
| 5,788,568 A | 8/1998 | Ito et al. |
| 5,793,610 A | 8/1998 | Schmitt et al. |
| 5,800,258 A | 9/1998 | Knoop |
| 5,861,585 A | 1/1999 | Van Every et al. |
| 5,871,556 A | 2/1999 | Jeanseau et al. |
| 5,876,279 A | 3/1999 | Renz et al. |
| 5,918,644 A | 7/1999 | Haack |
| 5,949,646 A | 9/1999 | Lee |
| 5,960,638 A | 10/1999 | McCabe |
| 5,971,034 A | 10/1999 | Heisey |
| 5,999,403 A | 12/1999 | Neustadt |
| 6,011,689 A | 1/2000 | Wrycraft |
| 6,031,717 A | 2/2000 | Baddour et al. |
| 6,050,774 A | 4/2000 | LeBaron |
| 6,072,397 A | 6/2000 | Ostrowski |
| 6,104,608 A | 8/2000 | Casinelli et al. |
| 6,131,077 A | 10/2000 | Normann et al. |
| 6,148,867 A | 11/2000 | Matthews |
| 6,155,335 A | 12/2000 | Acre et al. |
| 6,158,519 A | 12/2000 | Kretschmer |
| 6,161,593 A | 12/2000 | Lardillat |
| 6,228,476 B1 | 5/2001 | Bogrett |
| 6,253,873 B1 | 7/2001 | Norres |
| 6,257,832 B1 | 7/2001 | Lyszkowski et al. |
| 6,284,313 B1 | 9/2001 | Matthews et al. |
| 6,284,343 B1 | 9/2001 | Maples |
| 6,339,186 B1 | 1/2002 | Stephens |
| 6,351,920 B1 | 3/2002 | Hopkins |
| 6,368,064 B1 | 4/2002 | Bendikas |
| 6,374,623 B1 | 4/2002 | Gubbels |
| 6,379,111 B1 | 4/2002 | Katoh |
| 6,386,826 B1 | 5/2002 | Jacob |
| 6,386,969 B1 | 5/2002 | O'Brien |
| 6,388,880 B1 | 5/2002 | El-Ghobashy et al. |
| 6,396,688 B1 | 5/2002 | Davies |
| 6,398,505 B1 | 6/2002 | Sekiguchi |
| 6,399,186 B2 | 6/2002 | Matthews et al. |
| 6,407,918 B1 | 6/2002 | Edmunds et al. |
| 6,414,845 B2 | 7/2002 | Bonet |
| 6,427,455 B1 | 8/2002 | Furubayashi |
| 6,436,130 B1 | 8/2002 | Philips et al. |
| 6,463,891 B2 | 10/2002 | Algrain et al. |
| 6,480,892 B1 | 11/2002 | Levay et al. |
| 6,481,635 B2 | 11/2002 | Riley |
| 6,522,539 B2 | 2/2003 | Ota |
| 6,554,697 B1 | 4/2003 | Koplin |
| 6,554,698 B1 | 4/2003 | Kranzdorf |
| 6,590,768 B1 | 7/2003 | Wiley |
| 6,594,148 B1 | 7/2003 | Nguyen |
| 6,604,603 B1 | 8/2003 | Wirth |
| 6,648,590 B2 | 11/2003 | Huang et al. |
| 6,657,858 B2 | 12/2003 | Rothschild |
| 6,675,739 B2 | 1/2004 | Terrell et al. |
| 6,690,576 B2 | 2/2004 | Clements et al. |
| 6,710,571 B2 * | 3/2004 | Menendez Fernandez ... 318/709 |
| 6,791,836 B2 | 9/2004 | Cipolla et al. |
| 6,792,766 B2 | 9/2004 | Osborne et al. |
| 6,801,004 B2 | 10/2004 | Frankel et al. |
| 6,813,152 B2 | 11/2004 | Perazzo |
| 6,814,546 B2 | 11/2004 | Sekiguchi |
| 6,826,456 B1 | 11/2004 | Irving |
| 6,932,696 B2 | 8/2005 | Schwartz et al. |
| 6,961,248 B2 | 11/2005 | Vincent et al. |
| 6,981,200 B2 | 12/2005 | Maung et al. |
| 6,988,868 B2 | 1/2006 | Ashworth |
| 7,137,775 B2 | 11/2006 | Hopkins |
| 7,154,748 B2 | 12/2006 | Yamada |
| 7,170,380 B2 | 1/2007 | Fischer et al. |
| 7,179,046 B2 | 2/2007 | Hopkins |

| | | | |
|---|---|---|---|
| 7,577,898 | B2 | 8/2009 | Costa et al. |
| 7,607,070 | B2 | 10/2009 | Clark et al. |
| 7,788,568 | B1 | 8/2010 | Huang et al. |
| 7,914,252 | B2* | 3/2011 | Hopkins ............... 415/61 |
| 8,087,877 | B2 | 1/2012 | Hopkins |
| 8,166,355 | B2 | 4/2012 | Jashek et al. |
| 2003/0209945 | A1 | 11/2003 | Hanson |
| 2004/0028522 | A1 | 2/2004 | Lin |
| 2004/0032722 | A1 | 2/2004 | Wrycraft |
| 2004/0076814 | A1 | 4/2004 | Schonebeck |
| 2004/0185771 | A1 | 9/2004 | Hopkins |
| 2005/0180846 | A1 | 8/2005 | Hopkins |
| 2005/0232753 | A1 | 10/2005 | Hopkins |
| 2012/0057962 | A1 | 3/2012 | Hopkins |

FOREIGN PATENT DOCUMENTS

| | | |
|---|---|---|
| EP | 0004448 A1 | 3/1979 |
| EP | 0205979 A1 | 12/1986 |
| EP | 0205979 B1 | 10/1988 |
| EP | 0 619 461 A2 | 12/1994 |
| GB | 2334756 | 9/1999 |
| JP | 4-103937 A | 4/1992 |
| JP | 447200 | 4/1992 |
| JP | 453138 | 5/1992 |
| JP | 8089747 | 4/1996 |
| JP | 8114342 | 5/1996 |
| JP | 8261531 | 10/1996 |
| JP | 9010534 | 1/1997 |
| JP | 11132489 | 5/1999 |
| JP | 11211164 | 8/1999 |
| JP | 2001074302 A | 3/2001 |
| JP | 2001092466 A | 4/2001 |
| JP | 2003041681 A | 2/2003 |
| WO | WO 96/19701 | 6/1996 |

OTHER PUBLICATIONS

AAON Product Brochure; RL Series Rooftop Conditioner; Aug. 2006; 5 pages.
Governair Corporation DX Package Units Case Studies; 12 pages.
Expert Report of Gerald J. Mossinghoff; *Huntair Inc.* vs *Climatecraft, Inc.*; Case No. 07 C 6890; In the United States District Court for the Northern District of Illinois, Eastern Division; Nov. 26, 2008; 17 pages.
U.S. Appl. No. 10/606,435, "Air Handler Insulation"; 22 pages.
Jorgensen, R.; Fan Engineering: An Engineer's Handbook on Fans and Their Applications; Howden Buffalo, Inc.; $9^{th}$ Edition (1999), Chapter 14, 32 pages.
Hydeman, M. et al; Advanced Variable Air Volume System Design Guide, California Energy Commission's Public Interest Energy Research (PIER) program, Oct. 2003, 2 pages.
Industrial Technologies Program, Energy Efficiency and Renewable Energy, US Department of Energy, Improving Fan System Performance: A Sourcebook for Industry, Feb. 2003, pp. 51-53.
Bleier, F.P.; Fan Handbook, Selection, Application and Design; McGraw Hill; 1997; p. 7.55-7.56.
Letter—Santangelo Law Offices, P.C.; Dec. 16, 2010; Alfred k. Wiedmann, Jr.; 2 pages.
Temtrol, Inc.; Job—Hobby Center for Performing Arts; Serial No. 910-77837-49; Oct. 21, 1999; 17 pages.
Temtrol, Inc.; Project—DTI Office Building; Serial 14-83004; May 2, 2001; 8 pages.
Temtrol, Inc.: Project—Kaiser Redwood City; Serial No. 17-83615; Jul. 20, 2001; 7 pages.
Temtrol, Inc.: UNF—Science & Engineering; Serial No. 19-84150-2; Oct. 5, 2001; 19 pages.
RL Series, 45-230 Tons, Packaged Rooftop Conditioners and Air Handlers, CL000596-660; 65 pages.
Aaon Product Brochure RL Series Rooftop Conditioner 2006, CL 9577-9581, 5 pages.
Alliance Air Products Drawings and Specs, Jul. 21, 2009; 4 pages.
Ecosaire by Dectron; Precision Comfort Control; 16 pages, 2007.
Energy Labs Inc. White Paper Series, vol. 1205, issue 002, Dec. 16, 2005, Rev. 1; 9 pages.
Haakon Industries, Nov. 2, 2006, Climatec Fax; 18 pages.
MIA Air Systems Engineering, Oct. 7, 2007 ; 12 pages.
AAON Engineering Specs, CL000662; 1 page.
Expert Report of Dr. James Rice Submitted by ClimateCraft, Inc. on Nov. 26, 2008 in USDC for the Norther District of Illinois Eastern District Case No. 07C6890, *Huntair Inc., plaintiff,* v.*ClimateCraft, Inc., defendant; & ClimateCraft, Inc.,counterclaim plaintiff* v. *Huntair, Inc.,counterclaim defendant*, 130.
Letter; Santangelo Law Offices, P.C., dated Jan. 26, 2011 from Alfred K. Wiedmann, Jr., 2 pgs.
Letter; Santangelo Law offices, P.C., dated Dec. 16, 2010 from Alfred K. Wiedmann, Jr., 2 pgs.
Jim Parro (Marketing Manager for AAON) New Promotional Literature the RL Series, one page.
AAON, RL Series 45 to 230 tons Packaged Rooftop Conditioners & Air Handlers, 67 pages.
AAON, Invoice No. 265184, Feb. 28, 2002, one page.
AAON, Order Form and Associated Documents, Nov. 19, 2001, 8 pages.
Osborne, w.C. and Turner, C.G., co-editors Woods Practical Guide to Fan Engineering, 1964, cover pages and pp. 121, 137-138, 146-148, 208 and 218, Benham & Company, Colchester, England.
Wilcke, William F. and Morey, R. Vance, "Selecting Fans, Determining Airflow for Crop Drying, Cooling, Storage," 1998, 8 pages, Regents of the University of Minnesota.
The Parallel and Series Operation, Sunon Group web page http://www.sunon.corp/english/wealthtecht/tech-06.htm at least as early as Mar. 15, 2004, 2 pages, Sunon Group, Taiwan.
Series and Parallel Fans, HighBeam Research web page www.static.highbeam.com.m.machinedesign/january261995/seriesandparallelfans/index.htm, Jan. 26, 1995, 1 pg., HighBeam Research, LLC.
Mcleod, Ian, Using Fans in Series and Parallel: Performance Guidelines, ebmpapst web page, http://www.papstplc.com/features/articles/art006&print+true. At least as earlyas Mar. 15, 2004, 3 pgs, emb-Pabst Automotive Drives (UK) Ltd., UK.
Technical Bulletin: CLEANPAK M/R/PF/Multi/Redundant/Plenum Fan, at least as early as Mar. 15, 2004, 3 pages, CLEANPAK International, Clackamas, Oregon.
Installation Operating and Maintenance Manual, 2003, 12 pages, Greenheck Fan Corp., Schofield, Wisconsin.
DPL Series—Delhis Pensum Fan: Installation and maintenance Instructions, Nov. 2001, 2 pages, Delhi Industries, Inc., Delhi, Ontario, Canada.
AAON order form, estimating worksheet, and facsimile transmission regarding The Commons job, dated Sep. 15, 1998, Sep. 30, 1998 and Jun. 30, 1998 (3 pages).
AAON RL Feature Master Number sheet, dated Oct. 17, 2001 (1 page).
AAON wiring diagram assignment and verification regarding Farm Show Arena job, Apr. 1, 2002 (1 page).
AAON worksheet and drawing regarding Borders East Towers job for customer Borders Group, dated Feb. 26, 2001 and Feb. 6, 2001 (2 pages).
AAON worksheet and drawing regarding Harrison Hills job, both dated Feb. 26, 2002 (2 pages).
AAON, RL Series Rooftop Conditioners, Sep. 2001.
JP 518,910/2005—Examiner's refusal in English & Japanese, Oct. 2006.
Mammouth Selection Guide for Custom Penthouse (200-410 Tons Cooling-only VAV Configurations, 1992 (14 pages).
Prior Art Submission from Dean Small dated Apr. 5, 2011 (2 pages) and Letter from Thomas J. Otterlee dated Mar. 18, 2011 ( 6 pages) (Total of 8 pages).

* cited by examiner

FIG. 5

A 5×5 grid of cells, each labeled 200, with reference 202 pointing to the grid.

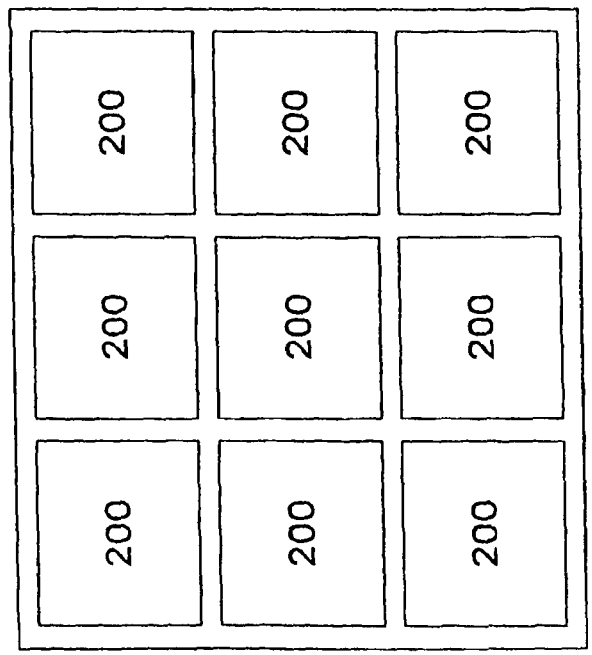
FIG. 10
FIG. 9

FAN ARRAY FAN SECTION IN AIR-HANDLING SYSTEMS

CROSS REFERENCE TO RELATED APPLICATIONS

This application is a Continuation of application Ser. No. 11/982,233 filed Oct. 31, 2007 which is a Continuation of application Ser. No. 11/595,212, filed Nov. 9, 2006 which is a Continuation-in-Part of application Ser. No. 10/806,775, filed Mar. 22, 2004, now U.S. Pat. No. 7,137,775 which is a Continuation-in-Part of PCT/US04/08578, filed Mar. 19, 2004 and claims benefit of 60/456,413, filed Mar. 20, 2003 and 60/554,702, filed Mar. 20, 2004, all of which are hereby incorporated herein by reference in their entirety.

BACKGROUND OF THE INVENTION

The present invention is directed to a fan array fan section utilized in an air-handling system.

Air-handling systems (also referred to as an air handler) have traditionally been used to condition buildings or rooms (hereinafter referred to as "structures"). An air-handling system is defined as a structure that includes components designed to work together in order to condition air as part of the primary system for ventilation of structures. The air-handling system may contain components such as cooling coils, heating coils, filters, humidifiers, fans, sound attenuators, controls, and other devices functioning to meet the needs of the structures. The air-handling system may be manufactured in a factory and brought to the structure to be installed or it may be built on site using the necessary devices to meet the functioning needs of the structure. The air-handling compartment 102 of the air-handling system includes the inlet plenum 112 prior to the fan inlet cone 104 and the discharge plenum 110. Within the air-handling compartment 102 is situated the fan unit 100 (shown in FIGS. 1 and 2 as an inlet cone 104, a fan 106, and a motor 108), fan frame, and any appurtenance associated with the function of the fan (e.g. dampers, controls, settling means, and associated cabinetry). Within the fan 106 is a fan wheel (not shown) having at least one blade. The fan wheel has a fan wheel diameter that is measured from one side of the outer periphery of the fan wheel to the opposite side of the outer periphery of the fan wheel. The dimensions of the handling compartment 102 such as height, width, and airway length are determined by consulting fan manufacturers data for the type of fan selected.

FIG. 1 shows an exemplary prior art air-handling system having a single fan unit 100 housed in an air-handling compartment 102. For exemplary purposes, the fan unit 100 is shown having an inlet cone 104, a fan 106, and a motor 108. Larger structures, structures requiring greater air volume, or structures requiring higher or lower temperatures have generally needed a larger fan unit 100 and a generally correspondingly larger air-handling compartment 102.

As shown in FIG. 1, an air-handling compartment 102 is substantially divided into a discharge plenum 110 and an inlet plenum 112. The combined discharge plenum 110 and the inlet plenum 112 can be referred to as the airway path 120. The fan unit 100 may be situated in the discharge plenum 110 as shown), the inlet plenum 112, or partially within the inlet plenum 112 and partially within the discharge plenum 110. The portion of the airway path 120 in which the fan unit 100 is positioned may be generically referred to as the "fan section" (indicated by reference numeral 114). The size of the inlet cone 104, the size of the fan 106, the size the motor 108, and the size of the fan frame (not shown) at least partially determine the length of the airway path 120. Filter banks 122 and/or cooling coils (not shown) may be added to the system either upstream or downstream of the fan units 100.

For example, a first exemplary structure requiring 50,000 cubic feet per minute of air flow at six (6) inches water gage pressure would generally require a prior art air-handling compartment 102 large enough to house a 55 inch impeller, a 100 horsepower motor, and supporting framework. The prior art air-handling compartment 102, in turn would be approximately 92 inches high by 114 to 147 inches wide and 106 to 112 inches long. The minimum length of the air-handling compartment 102 and/or airway path 120 would be dictated by published manufacturers data for a given fan type, motor size, and application. Prior art cabinet sizing guides show exemplary rules for configuring an air-handling compartment 102. These rules are based on optimization, regulations, and experimentation.

For example, a second exemplary structure includes a recirculation air handler used in semiconductor and pharmaceutical clean rooms requiring 26,000 cubic feet per minute at two (2) inches water gage pressure. This structure would generally require a prior art air-handling system with a air-handling compartment 102 large enough to house a 44 inch impeller, a 25 horsepower motor, and supporting framework. The prior art air-handling compartment 102, in turn would be approximately 78 inches high by 99 inches wide and 94 to 100 inches long. The minimum length of the air-handling compartment 102 and/or airway path 120 would be dictated by published manufacturers data for a given fan type, motor size and application. Prior art cabinet sizing guides show exemplary rules for configuring an air-handling compartment 102. These rules are based on optimization, regulations, and experimentation.

These prior art air-handling systems have many problems including the following exemplary problems:

- Because real estate (e.g. structure space) is extremely expensive, the larger size of the air-handling compartment 102 is extremely undesirable.
- The single fan units 100 are expensive to produce and are generally custom produced for each job.
- Single fan units 100 are expensive to operate.
- Single fan units 100 are inefficient in that they only have optimal or peak efficiency over a small portion of their operating range.
- If a single fan unit 100 breaks down, there is no air conditioning at all.
- The low frequency sound of the large fan unit 100 is hard to attenuate.
- The high mass and turbulence of the large fan unit 100 can cause undesirable vibration.

Height restrictions have necessitated the use of air-handling systems built with two fan units 100 arranged horizontally adjacent to each other. It should be noted, however, that a good engineering practice is to design air handler cabinets and discharge plenums 110 to be symmetrical to facilitate more uniform air flow across the width and height of the cabinet. Twin fan units 100 have been utilized where there is a height restriction and the unit is designed with a high aspect ratio to accommodate the desired flow rate. As shown in the Greenheck "Installation Operating and Maintenance Manual," if side-by-side installation was contemplated, there were specific instructions to arrange the fans such that there was at least one fan wheel diameter spacing between the fan wheels and at least one-half a fan wheel diameter between the fan and the walls or ceilings. The Greenheck reference even specifically states that arrangements with less spacing will experience performance losses." Normally, the air-handling system and air-handling compartment 102 are designed for a uniform velocity gradient of 500 feet per minute velocity in the direction of air flow. The two fan unit 100 air-handling systems, however, still substantially suffered from the problems of the single unit embodiments. There was no recognition of advantages by increasing the number of fan units 100 from one to two. Further, the two fan unit 100 section exhibits a non-uniform velocity gradient in the region following the fan unit 100 that creates uneven air flow across filters, coils, and sound attenuators.

It should be noted that electrical devices have taken advantage of multiple fan cooling systems. For example, U.S. Pat. No. 6,414,845 to Bonet uses a multiple-fan modular cooling component for installation in multiple component-bay electronic devices. Although some of the advantages realized in the Bonet system would be realized in the present system, there are significant differences. For example, the Bonet system is designed to facilitate electronic component cooling by directing the output from each fan to a specific device or area. The Bonet system would not work to direct air flow to all devices in the direction of general air flow. Other patents such as U.S. Pat. No. 4,767,262 to Simon and U.S. Pat. No. 6,388,880 to El-Ghobashy et al. teach fan arrays for use with electronics.

Even in the computer and machine industries, however, operating fans in parallel is taught against as not providing the desired results except in low system resistance situations where fans operate in near free delivery. For example, Sunon Group has a web page in which they show two axial fans operating in parallel, but specifically state that 'if the parallel fans are applied to the higher system resistance that [an] enclosure has, . . . less increase in flow results with parallel fan operation." Similar examples of teaching against using fans in parallel are found in an article accessible from HighBeam Research's library (http://stati.highbeam.com) and an article by Ian McLeod accessible at (http://www.papstplc.com).

BRIEF SUMMARY OF THE INVENTION

The present invention is directed to a fan array fan section in an air-handling system that includes a plurality of fan units arranged in a fan array and positioned within an air-handling compartment. One preferred embodiment may include an array controller programmed to operate the plurality of fan units at peak efficiency. The plurality of fan units may be arranged in a true array configuration, a spaced pattern array configuration, a checker board array configuration, rows slightly offset array configuration, columns slightly offset array configuration, or a staggered array configuration.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWINGS

FIG. 5 is a plan or elevation view of a 5×5 exemplary fan array fan section in an air-handling system of the present invention having a plurality of small fan units within an air-handling compartment.

FIG. 9 is a plan or elevation view of an alternative exemplary fan array fan section in an air-handling system of the present invention in which a plurality of small fan units are arranged in a spaced pattern array within an air-handling compartment.

FIG. 10 is a plan or elevation view of an alternative exemplary fan array fan section in an air-handling system of the present invention in which a plurality of small fan units are arranged in a checker board array within an air-handling compartment.

FIG. 11 is a plan or elevation view of an alternative exemplary fan array fan section in an air-handling system of the present invention in which a plurality of small fan units are arranged in rows slightly offset array within an air-handling compartment.

FIG. 12 is a plan or elevation view of an alternative exemplary fan array fan section in an air-handling system of the present invention in which a plurality of small fan units are arranged in columns slightly offset array within an air-handling compartment.

DETAILED DESCRIPTION OF THE INVENTION

Figures 11, 12:
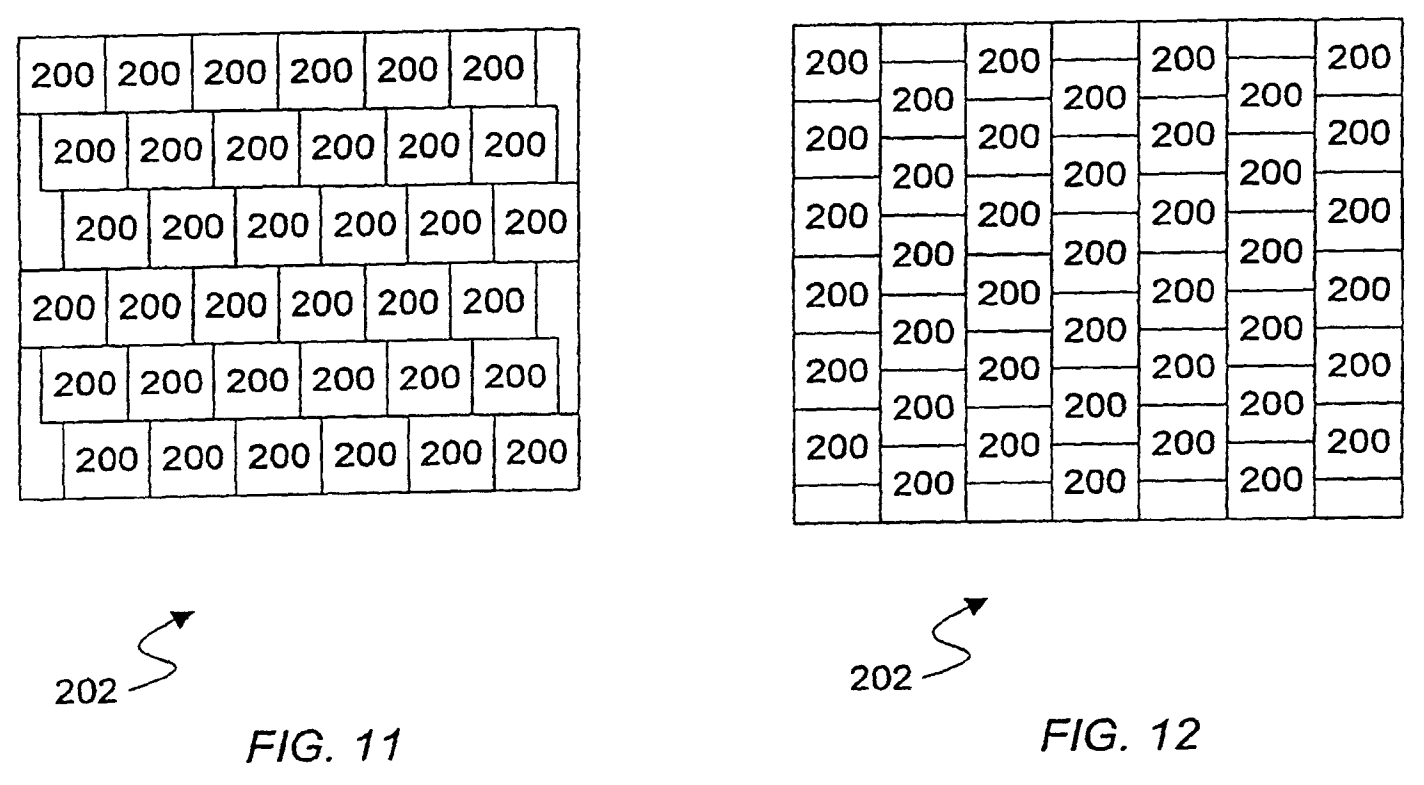
Figure 1:
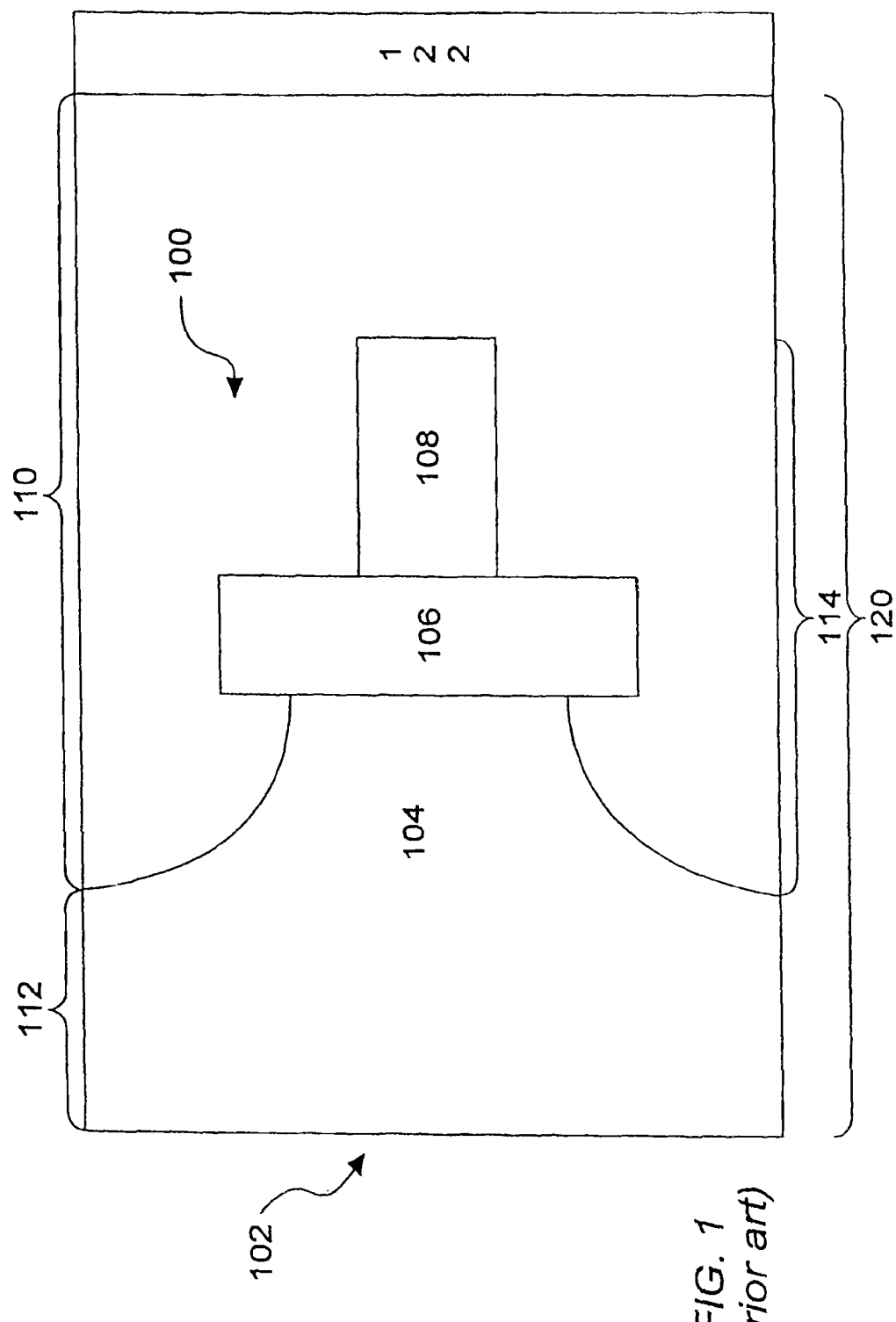
FIG. 1 is a side view of an exemplary prior art air-handling system having a single large fan unit within an air-handling compartment.
Figure 2:
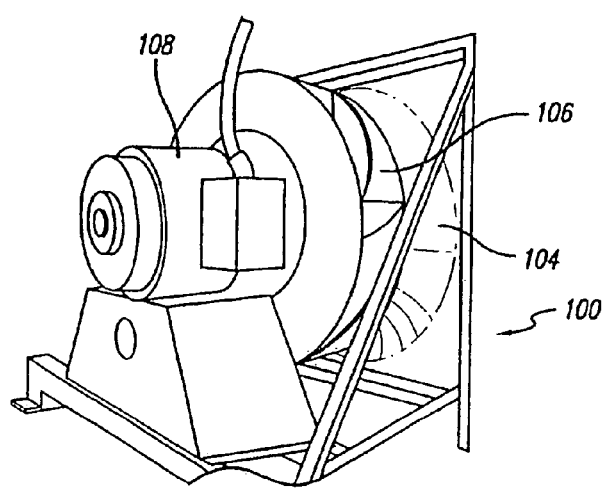
FIG. 2 is a perspective view of an exemplary prior art large fan unit.

The present invention is directed to a fan array fan section in an air-handling system. As shown in FIGS. 3-12, the fan array fan section in the air-handling system uses a plurality of individual single fan units 200. In one preferred embodiment,~ the fan units 200 are arranged in a true array (FIGS. 4-8), but alternative embodiments may include, for example, alternative arrangements such as in a spaced pattern (FIG. 9), a checker board (FIG. 10), rows slightly offset (FIG. 11), or columns slightly offset (FIG. 12). As the present invention could be implemented with true arrays and/or alternative arrays, the term "array" is meant to be comprehensive.

The fan units 200 in the fan array of the present invention may be spaced as little as 20% of a fan wheel diameter. Optimum operating conditions for a closely arranged array may be found at distances as low as 30% to 60% of a fan wheel diameter. By closely spacing the fan units 200, more air may be moved in a smaller space. For example, if the fan wheels of the fan units 200 have a 20 inch fan wheel diameter, only a 4 inch space (20%) is needed between the outer periphery of one fan wheel and the outer periphery of the adjacent fan wheel (or a 2 inch space between the outer periphery of a fan wheel and an the adjacent wall or ceiling).

By using smaller fan units 200 it is possible to support the fan units 200 with less intrusive structure (fan frame). This can be compared to the large fan frame that supports prior art fan units 100 and functions as a base. This large fan frame must be large and sturdy enough to support the entire weight of the prior art fan units 100. Because of their size and position, the known fan frames cause interference with air flow. In the preferred embodiment, therefore, the fan units 200 of the fan array may be supported by a frame that supports the motors 108 with a minimum restriction to air flow.

As mentioned in the Background, others have tried using side-by-side installation of two fan units 100 arranged horizontally adjacent to each other within an air-handling system. As is also mentioned in the Background, fan arrays have been used in electronic and computer assemblies. However, in the air-handling system industry, it has always been held that there must be significant spacing between the horizontally arranged fan wheels and that arrangements with less spacing will experience performance losses. A single large fan moves all the air in a cabinet. Using two of the same or slightly smaller fans caused the air produced by one fan to interfere with the air produced by the other fan. To alleviate the interference problem, the fans had to be spaced within certain guidelines—generally providing a clear space between the fans of a distance of at least one wheel diameter (and a half a wheel diameter to an adjacent wall). Applying this logic, it would not have made sense to add more fans. And even if additional fans had been added, the spacing would have continued to be at least one wheel diameter between fans. Further, in the air-handling system industry, vertically stacking fan units would have been unthinkable because the means for securing the fan units would not have been conducive to such stacking (they are designed to be positioned on the floor only).

It should be noted that the plenum fan is the preferred fan unit 200 of the present invention. In particular, the APF-121, APF-141, APF-161, and APF-181 plenum fans (particularly the fan wheel and the fan cone) produced by Twin City Fan Companies, Ltd. of Minneapolis, Minn., U.S. has been found to work well. The reason that plenum fans work best is that they do not produce points of high velocity such as those produced by axial fans and housed centrifugal fans and large plenum fans. Alternative embodiments use known fan units or fan units yet to be developed that will not produce high velocity gradients in the direction of air flow. Still other embodiments, albeit less efficient, use fan units such as axial fans and/or centrifugal housed fans that have points of high velocity in the direction of air flow.

Figure 13:
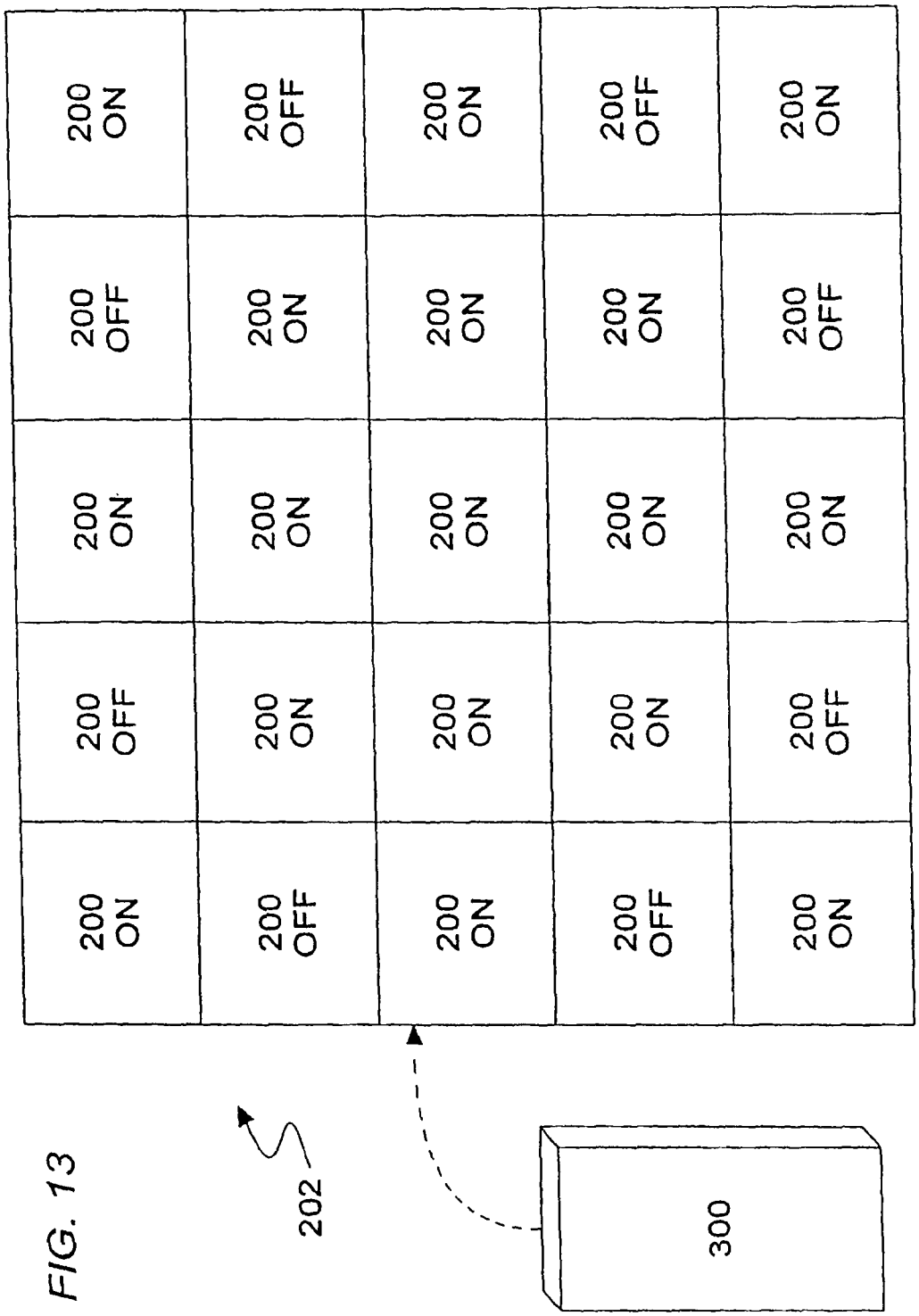
FIG. 13 is a plan or elevation view of a 5×5 exemplary fan array fan section in an air-handling system of the present invention running at 52% capacity by turning a portion of the fans on and a portion of the fans off.
Figure 14:
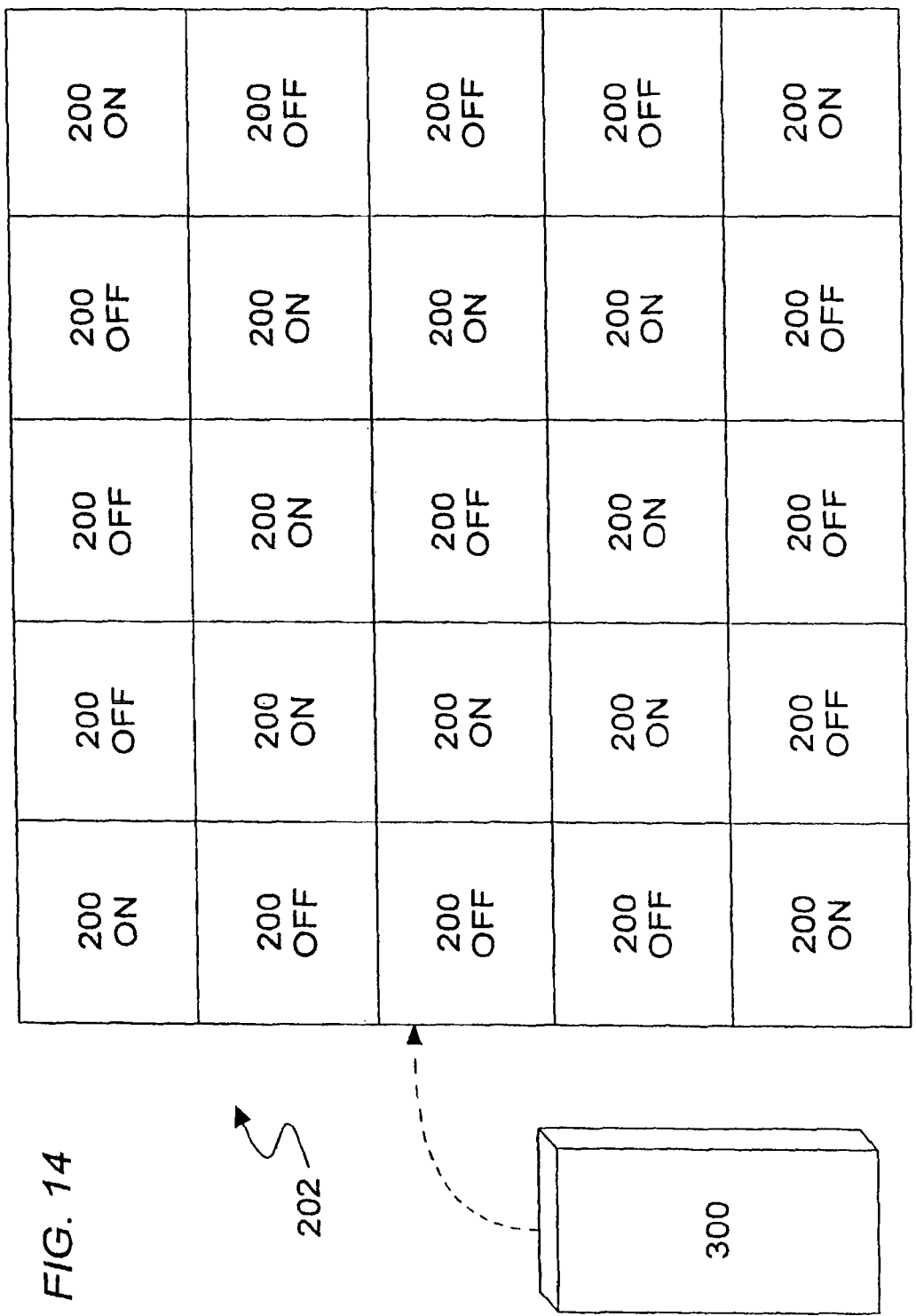
FIG. 14 is a plan or elevation view of a 5×5 exemplary fan array fan section in an air-handling system of the present invention running at 32% capacity by turning a portion of the fans on and a portion of the fans off.

In the preferred embodiment, each of the fan units 200 in the fan array fan section in the air-handling system is controlled by an array controller 300 (FIGS. 13 and 14). In one preferred embodiment, the array controller 300 may be programmed to operate the fan units 200 at peak efficiency. In this peak efficiency embodiment, rather than running all of the fan units 200 at a reduced efficiency, the array controller 300 turns off certain fan units 200 and runs the remaining fan units 200 at peak efficiency. In an alternative embodiment, the fan units 200 could all run at the same power level (e.g. efficiency and/or flow rate) of operation.

Another advantage of the present invention is that the array controller 300 (which may be a variable frequency drive (VFD)) used for controlling fan speed and thus flow rate and pressure, could be sized for the actual brake horsepower of the fan array fan section in the air-handling system. Since efficiency of the fan wall array can be optimized over a wide range of flow rates and pressures, the actual operating power consumed by the fan array is substantially less than the actual operating power consumed by the comparable prior art air-handling systems and the array controller's power could be reduced accordingly. The array controller 300 could be sized to the actual power consumption of the fan array where as the controller (which may have been a variable frequency drive) in a traditional design would be sized to the maximum nameplate rating of the motor per Electrical Code requirements. An example of a prior art fan design supplying 50,000 cubic feet per minute of air at 2.5 inches pressure, would require a 50 horsepower motor and 50 horsepower controller. The new invention will preferably use an array of fourteen 2 horsepower motors and a 30 horsepower array controller 300.

This invention solves many of the problems of the prior art air-handling systems including, but not limited to real estate, reduced production costs, reduced operating expenses, increased efficiency, improved air flow uniformity, redundancy, sound attenuation advantages, and reduced vibration.

Controllability

As mentioned, preferably each of the fan units 200 in the fan array fan section in the air-handling system is controlled by an array controller 300 (FIGS. 13 and 14) that may be programmed to operate the fan units 200 at peak efficiency. In this peak efficiency embodiment, rather than running all of the fan units 200 at a reduced efficiency, the array controller 300 is able to turn off certain fan units 200 and run the remaining fan units 200 at peak efficiency. Preferably, the array controller 300 is able to control fan units 200 individually, in predetermined groupings, and/or as a group as a whole.

For example, in the 5×5 fan array such as that shown in FIGS. 5, 13, and 14, a person desiring to control the array may select desired air volume, a level of air flow, a pattern of air flow, and/or how many fan units 200 to operate. Turning first to air volume, each fan unit 200 in a 5×5 array contributes 4% of the total air. In variable air volume systems, which is what most structures have, only the number of fan units 200 required to meet the demand would operate. A control system (that may include the array controller 300) would be used to take fan units 200 on line (an "ON" fan unit 200) and off line (an "OFF" fan unit 200) individually. This ability to turn fan units 200 on and off could effectively eliminate the need for a variable frequency drive. Similarly, each fan unit 200 in a 5×5 array Uses 4% of the total power and produces 4% of the level of air flow. Using a control system to take fan units 200 on line and off line allows a user to control power usage and/or air flow. The pattern of air flow can also be controlled if that would be desirable. For example, depending on the system it is possible to create a pattern of air flow only around the edges of a cabinet or air only at the top. Finally, individual fan units 200 may be taken on line and off line. This controllability may be advantageous if one or more fan units 200 are not working properly, need to be maintained (e.g. needs general service), and/or need to be replaced. The problematic individual fan units 200 may be taken off line while the remainder of the system remains fully functional. Once the individual fan units 200 are ready for use, they may be brought back on line.

A further advantage to taking fan units 200 on and off line occurs when building or structure control systems require low volumes of air at relatively high pressures. In this case, the fan units 200 could be modulated to produce a stable operating point and eliminate the surge effects that sometimes plague structure owners and maintenance staff. The surge effect is where the system pressure is too high for the fan speed at a given volume and the fan unit 200 has a tendency to go into stall.

Examples of controllability are shown in FIGS. 13 and 14. In the fan array fan section in the air-handling system shown in FIG. 13, the array controller 300 alternates "ON" fan units 200 and "OFF" fan units 200 in a first exemplary pattern as shown so that the entire system is set to operate at 52% of the maximum rated air flow but only consumes 32% of full rated power. These numbers are based on exemplary typical fan operations in a structure. FIG. 14 shows the fan array fan section in the air-handling system set to operate at 32% of the maximum rated air flow but only consumes 17% of full rated power. These numbers are based on exemplary typical fan operations in a structure. In this embodiment, the array controller 300 creates a second exemplary pattern of "OFF" fan units 200 and "ON" fan units 200 as shown.

Real Estate

Figure 3:
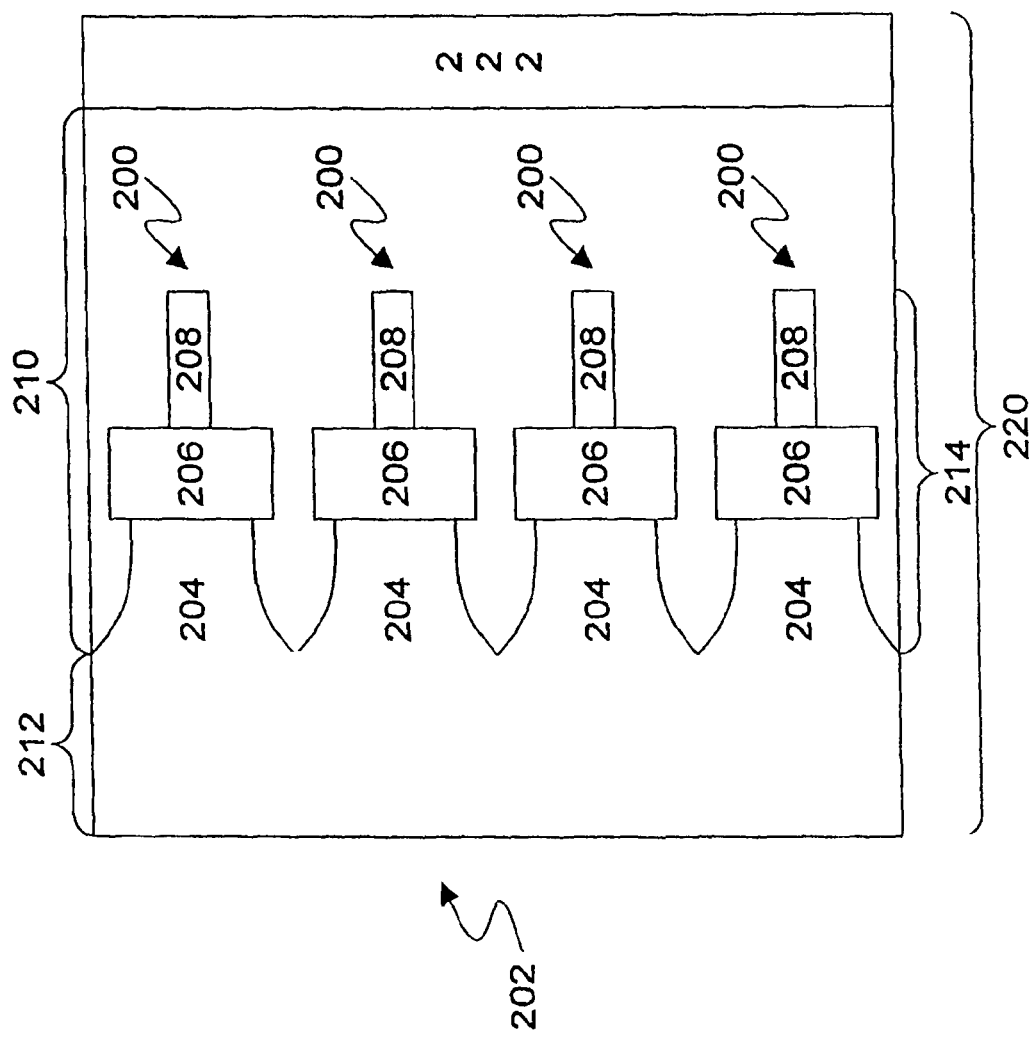
FIG. 3 is a side view of an exemplary fan array fan section in an air-handling system of the present invention having a plurality of small fan units within an air-handling compartment.

The fan array fan section in the air-handling section 220 of the present invention preferably uses (60% to 80%) less real estate than prior art discharge plenums 120 (with the hundred series number being prior art as shown in FIG. 1 and the two hundred series number being the present invention as shown in FIG. 3) in air-handling systems. Comparing the prior art (FIG. 1) and the present invention (FIG. 3) shows a graphical representation of this shortening of the airway path 120, 220. There are many reasons that using multiple smaller fan units 200 can reduce the length of the airway path 120, 220. For example, reducing the size of the fan unit 100, 200 and motor 108, 208 reduces the length of the discharge plenum 110, 210. Similarly, reducing the size of the inlet cone 104, 204 reduces the length of the inlet plenum 112, 212. The length of the discharge plenum 110, 210 can also be reduced because air from the fan array fan section in the air-handling system of the present invention is substantially uniform whereas the prior art air-handling system has points of higher air velocity and needs time and space to mix so that the flow is uniform by the time it exits the air-handling compartment 102, 202. (This can also be described as the higher static efficiency in that the present invention eliminates the need for settling means downstream from the discharge of a prior art fan system because there is little or no need to transition from high velocity to low velocity.) The fan array fan section in the air-handling system takes in air from the inlet plenum 212 more evenly and efficiently than the prior art air-handling system so that the length of the inlet plenum 112, 212 may be reduced.

For purposes of comparison, the first exemplary structure set forth in the Background of the Invention (a structure requiring 50,000 cubic feet per minute of air flow at a pressure of six (6) inches water gage) will be used. Using the first exemplary structure, an exemplary embodiment of the present invention could be served by a nominal discharge plenum 210 of 89 inches high by 160 inches wide and 30 to 36 inches long (as compared to 106 to 112 inches long in the prior art embodiments). The discharge plenum 210 would include a 3×4 fan array fan section in the air-handling system such as the one shown in FIG. 6) having 12 fan units 200. The space required for each exemplary fan unit 200 would be a rectangular cube of approximately 24 to 30 inches on a side depending on the array configuration. The airway path 220 is 42 to 48 inches (as compared to 88 to 139 inches in the prior art embodiments).

For purposes of comparison, the second exemplary structure set forth in the Background of the invention (a structure requiring 26,000 cubic feet per minute of air flow at a pressure of two (2) inches water gage) will be used. Using the second exemplary structure, an exemplary embodiment of the present invention could be served by a nominal discharge plenum 210 of 84 inches high by 84 inches wide, and 30 to 36 inches long (as compared to 94 to 100 inches long in the prior art embodiments). The discharge plenum would include a 3×3 fan array fan section in the air-handling system (such as the one shown in FIG. 7) having 9 fan units 200. The space required for each exemplary fan unit 200 would be a rectangular cube of approximately 24 to 30 inches on a side depending on the array configuration. The airway path 220 is 42 to 48 inches (as compared to 71 to 95 inches in the prior art embodiments).

Reduced Production Costs

It is generally more cost effective to build the fan array fan section in the air-handling system of the present invention as compared to the single fan unit 100 used in prior art air-handling systems. Part of this cost savings may be due to the fact that individual fan units 200 of the fan array can be mass-produced. Part of this cost savings may be due to the fact that it is less expensive to manufacture smaller fan units 200. Whereas the prior art single fan units 100 were generally custom built for the particular purpose, the present invention could be implemented on a single type of fan unit 200. In alternative embodiments, there might be several fan units 200 having different sizes and/or powers (both input and output). The different fan units 200 could be used in a single air-handling system or each air-handling system would have only one type of fan unit 200. Even when the smaller fan units 200 are custom made, the cost of producing multiple fan units 200 for a particular project is almost always less that the cost of producing a single large prior art fan unit 100 for the same project. This may be because of the difficulties of producing the larger components and/or the cost of obtaining the larger components necessary for the single large prior art fan unit 100. This cost savings also extends to the cost of producing a smaller air-handling compartment 202.

In one preferred embodiment of the invention, the fan units 200 are modular such that the system is "plug and play." Such modular units may be implemented by including structure for interlocking on the exterior of the fan units 200 themselves. Alternatively, such modular units may be implemented by using separate structure for interlocking the fan units 200. In still another alternative embodiment, such modular units may be implemented by using a grid system into which the fan units 200 may be placed.

Reduced Operating Expenses

The fan array fan section in the air-handling system of the present invention preferably are less expensive to operate than prior art air-handling systems because of greater flexibility of control and fine tuning to the operating requirements of the structure. Also, by using smaller higher speed fan units 200 that require less low frequency noise control and less static resistance to flow.

Increased Efficiency

The fan array fan section in the air-handling system of the present invention preferably is more efficient than prior art air-handling systems because each small fan unit 200 can run at peak efficiency. The system could turn individual fan units 200 on and off to prevent inefficient use of particular fan units 200. It should be noted that an array controller 300 could be used to control the fan units 200. As set forth above, the array controller 300 turns off certain fan units 200 and runs the remaining fan units 200 at peak efficiency.

Redundancy

Multiple fan units 200 add to the redundancy of the system. If a single fan unit 200 breaks down, there will still be cooling. The array controller 300 may take disabled fan units 200 into consideration such that there is no noticeable depreciation in cooling or air flow rate. This feature may also be useful during maintenance as the array controller 300 may turn off fan units 200 that are to be maintained offline with no noticeable depreciation in cooling or air flow rate.

Sound Attenuation Advantages

The high frequency sound of the small fan units 200 is easier to attenuate than the low frequency sound of the large fan unit. Because the fan wall has less low frequency sound energy, shorter less costly sound traps are needed to attenuate the higher frequency sound produced by the plurality of small fan units 200 than the low frequency sound produced by the single large fan unit 100. The plurality of fan units 200 will each operate in a manner such that acoustic waves from each unit will interact to cancel sound at certain frequencies thus creating a quieter operating unit than prior art systems.

Reduced Vibration

The multiple fan units 200 of the present invention have smaller wheels with lower mass and create less force due to residual unbalance thus causing less vibration than the large fan unit. The overall vibration of multiple fan units 200 will transmit less energy to a structure since individual fans will tend to cancel each other due to slight differences in phase. Each fan unit 200 of the multiple fan units 200 manage a smaller percentage of the total air handling requirement and thus produce less turbulence in the air stream and substantially less vibration.

Alternative Embodiments

As mentioned, in one preferred embodiment of the invention, the fan units 200 are modular such that the system is "plug and play." Such modular units may be implemented by including structure for interlocking on the exterior of the fan units 200 themselves. Alternatively, such modular units may be implemented by using separate structure for interlocking the fan units 200. In still another alternative embodiment, such modular units may be implemented by using a grid system into which the fan units 200 may be placed.

Figure 16:
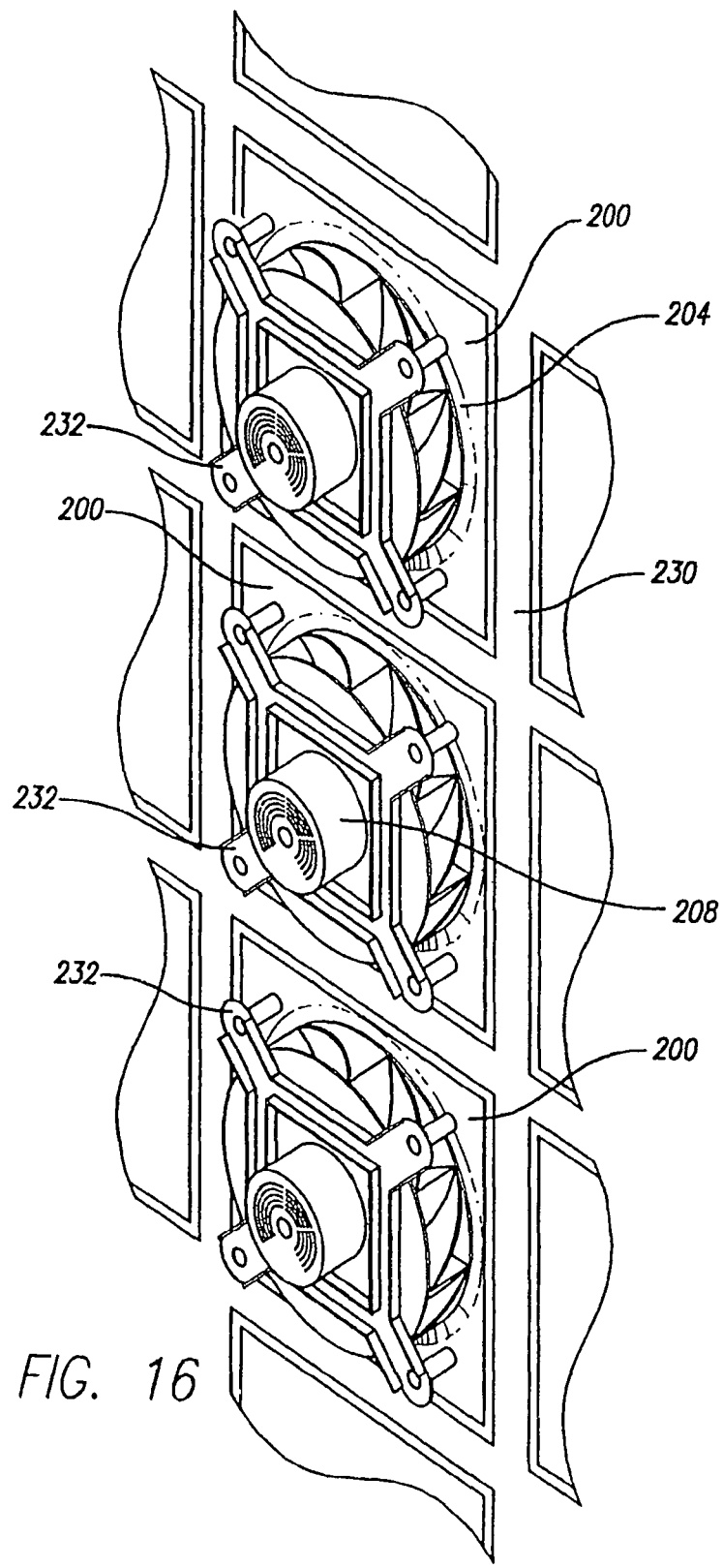
FIG. 16 is a perspective view of an exemplary fan array using a grid system into which fan units are mounted.

FIG. 16 shows an embodiment using an exemplary grid system 230 into which the fan units 200 may be placed. In this embodiment the grid may be positioned and/or built within the air-handling compartment 202. The fan units 200 may then be positioned into the grid openings. One advantage of this configuration is that individual fan units 200 may be easily removed, maintained, and/or replaced. This embodiment uses an exemplary unique motor mount 232 that supports the motor 208 without interfering with air flow therearound. As shown, this exemplary motor mount 232 has a plurality of arms that mount around the fan inlet cone 204. It should be noted that the dimensions of the grid are meant to be exemplary. The grid may be constructed taking into consideration that the fan units 200 in the present invention may be spaced with as little as 20% of a fan wheel diameter between the fan units 200.

Figure 17:
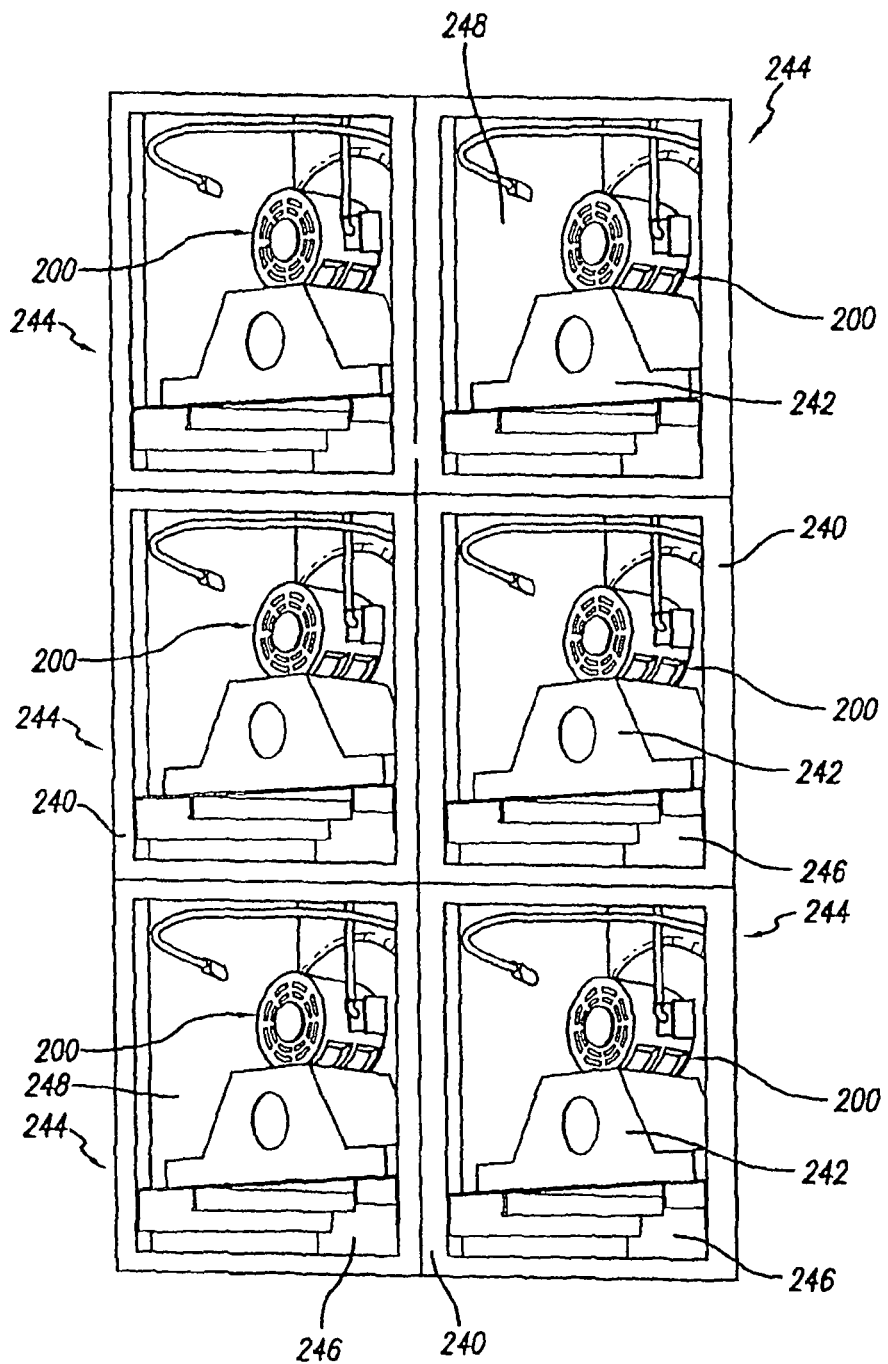
FIG. 17 is a perspective view of an exemplary fan array using a grid system or modular units each of which includes a fan units mounted within its own fan unit chamber.

FIG. 17 shows an embodiment using either a grid system or modular units 240 using separate structure (not shown) for interlocking the fan units 200. In this exemplary embodiment, each of the fan units 200 are mounted on a more traditional motor mount 242 within its own fan unit chamber 244. In one preferred embodiment, the fan unit 200 and motor mount 242 are preferably suspended within their own fan unit chamber 244 such that there is an air relief passage 246 therebelow. This air relieve passage 246 tends to improve air flow around the fan units 200.

The fan unit chambers 244 shown in FIG. 17 may include one or more interior surface made from or lined with an acoustically absorptive material or "insulation surface" 248. Going against conventional industry wisdom that surfaces cannot be placed in close proximity with the fan units 200, the present invention places one or more insulation surfaces 248 at least partially around each fan unit 200 without disrupting air flow. The insulation surfaces 248 may include one or more of the sides, top, bottom, front, or back. Exemplary types of insulation include, but are not limited to traditional insulation board (such as that made from inorganic glass fibers (fiberglass) alone or with a factory-applied foil-scrim-kraft (FSK) facing or a factory-applied all service jacket (ASJ)) or alternative insulation such as open cell foam such as that disclosed in U.S. patent application Ser. No. 10/606,435, which is assigned to the assignee of the present invention, and which the disclosure of which is hereby incorporated by reference herein. Together, the insulation surfaces 248 on the fan unit chambers 244 tend to function as a coplanar silencer. Some of the benefits of using the coplanar silencer include (1) no added airway length for splitters, (2) no pressure drop, and/or (3) relatively low cost. The acoustic advantages of this and other embodiments make the present invention ideal for use in concert halls, lecture halls, performing arts centers, libraries, hospitals, and other applications that are acoustically sensitive.

Although FIG. 17 shows the discharge plenum 210 positioned within the fan unit chambers 244, alternative embodiments of fan unit chambers 244 could enclose the inlet plenum 212, or at least partially enclose both the inlet plenum 212 and the discharge plenum 210. Still other alternative embodiments of fan unit chambers 244 may have grid or wire surfaces (that increase the safety of the present invention) or be open (that would reduce costs).

Figure 18:
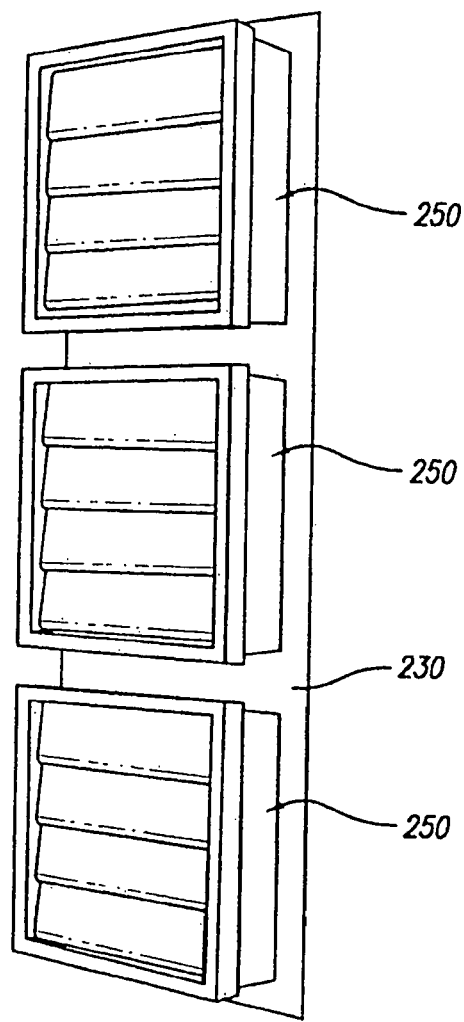
FIG. 18 is a perspective view of an exemplary array of dampeners that may be positioned either in front of or behind the fan units.

FIG. 18 shows an array of dampeners 250 that may be positioned either in front of or behind the fan units 200 to at least partially prevent back drafts. In the shown exemplary embodiment, the dampeners 250 include a plurality of plates, each plate positioned on its own pivot. In the shown exemplary embodiment, the plurality of plates slightly overlap each other. The shown embodiment is constructed such that when air is flowing through the fan units 200, the plates are in the open position and when the air stops, gravity pulls the plates into the closed position. Preferably, each of the dampeners 250 operates independently such that if some of the fan units 200 are ON and some of the fan units 200 are OFF, the dampeners 250 can open or close accordingly. Although shown as a simple mechanical embodiment, alternative embodiments could include structure that is controlled electronically and/or remotely from the dampeners 250.

Figure 4:
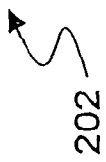
FIG. 4 is a plan or elevation view of a 4×6 exemplary fan array fan section in an air-handling system of the present invention having a plurality of small fan units within an air-handling compartment.
Figure 6:
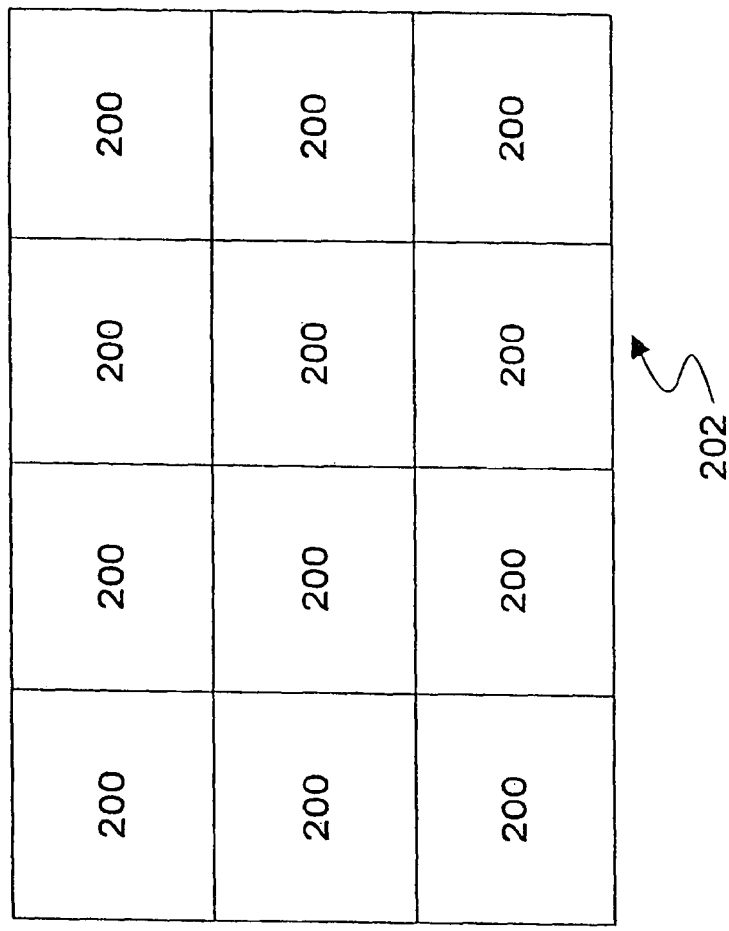
FIG. 6 is a plan or elevation view of a 3×4 exemplary fan array fan section in an air-handling system of the present invention having a plurality of small fan units within an air-handling compartment.
Figure 8:
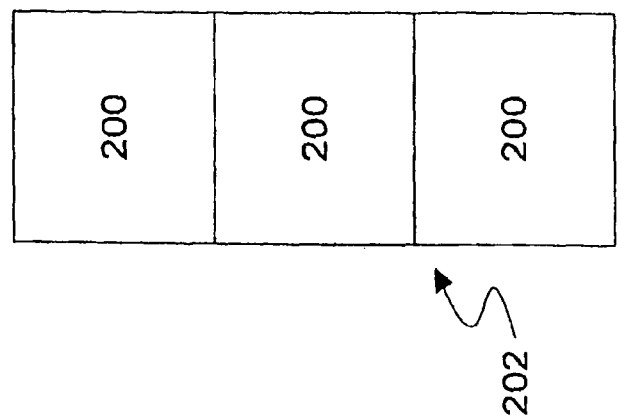
FIG. 8 is a plan or elevation view of a 3×1 exemplary fan array fan section in an air-handling system of the present invention having a plurality of small fan units within an air-handling compartment.
Figure 7:
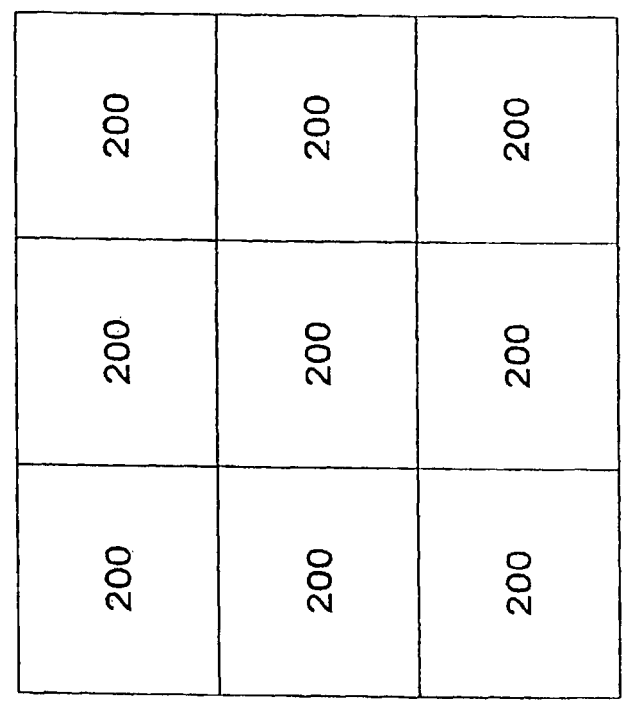
FIG. 7 is a plan or elevation view of a 3×3 exemplary fan array fan section in an air-handling system of the present invention having a plurality of small fan units within an air-handling compartment.
Figure 15:
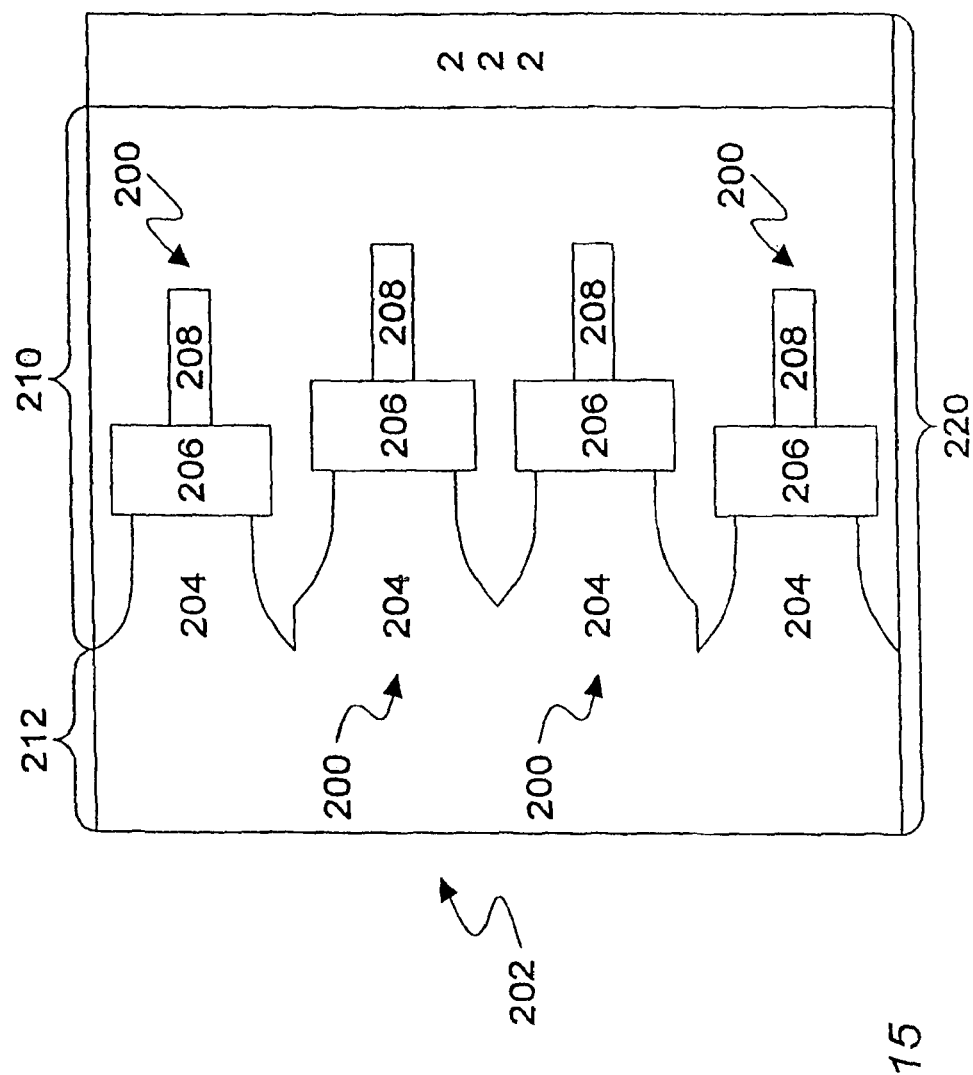
FIG. 15 is a side view of an alternative exemplary fan array fan section in an air-handling system of the present invention having a plurality of staggered small fan units within an air-handling compartment.

It should be noted that FIG. 4 shows a 4×6 fan array fan section in the air-handling system having twenty-four fan units 200, FIG. 5 shows a 5×5 fan array fan section in the air-handling system having twenty-five fan units 200, FIG. 6 shows a 3×4 fan array fan section in the air-handling system having twelve fan units 200, FIG. 7 shows a 3×3 fan array fan section in the air-handling system having nine fan units 200, and FIG. 8 shows a 3×1 fan array fan section in the air-handling system having three fan units 200. It should be noted that the array may be of any size or dimension of more than two fan units 200. It should be noted that although the fan units 200 may be arranged in a single plane (as shown in FIG. 3), an alternative array configuration could contain a plurality of fan units 200 that are arranged in a staggered configuration (as shown in FIG. 15) in multiple planes. It should be noted that cooling coils (not shown) could be added to the system either upstream or downstream of the fan units 200. It should be noted that, although shown upstream from the fan units 200, the filter bank 122, 222 could be downstream.

It should be noted that an alternative embodiment would use a horizontally arranged fan array. In other words, the embodiments shown in FIGS. 3-15 could be used horizontally or vertically or in any direction perpendicular to the direction of air flow. For example, if a vertical portion of air duct is functioning as the air-handling compartment 202, the fan array may be arranged horizontally. This embodiment would be particularly practical in an air handling compartment for a return air shaft.

It should be noted that the fan section 214 may be any portion of the airway path 220 in which the fan units 200 are positioned. For example, the fan units 200 may be situated in the discharge plenum 210 (as shown), the inlet plenum 212, or partially within the inlet plenum 212 and partially within the discharge plenum 210. It should also be noted that the air-handling compartment 202 may be a section of air duct.

Figure 19:
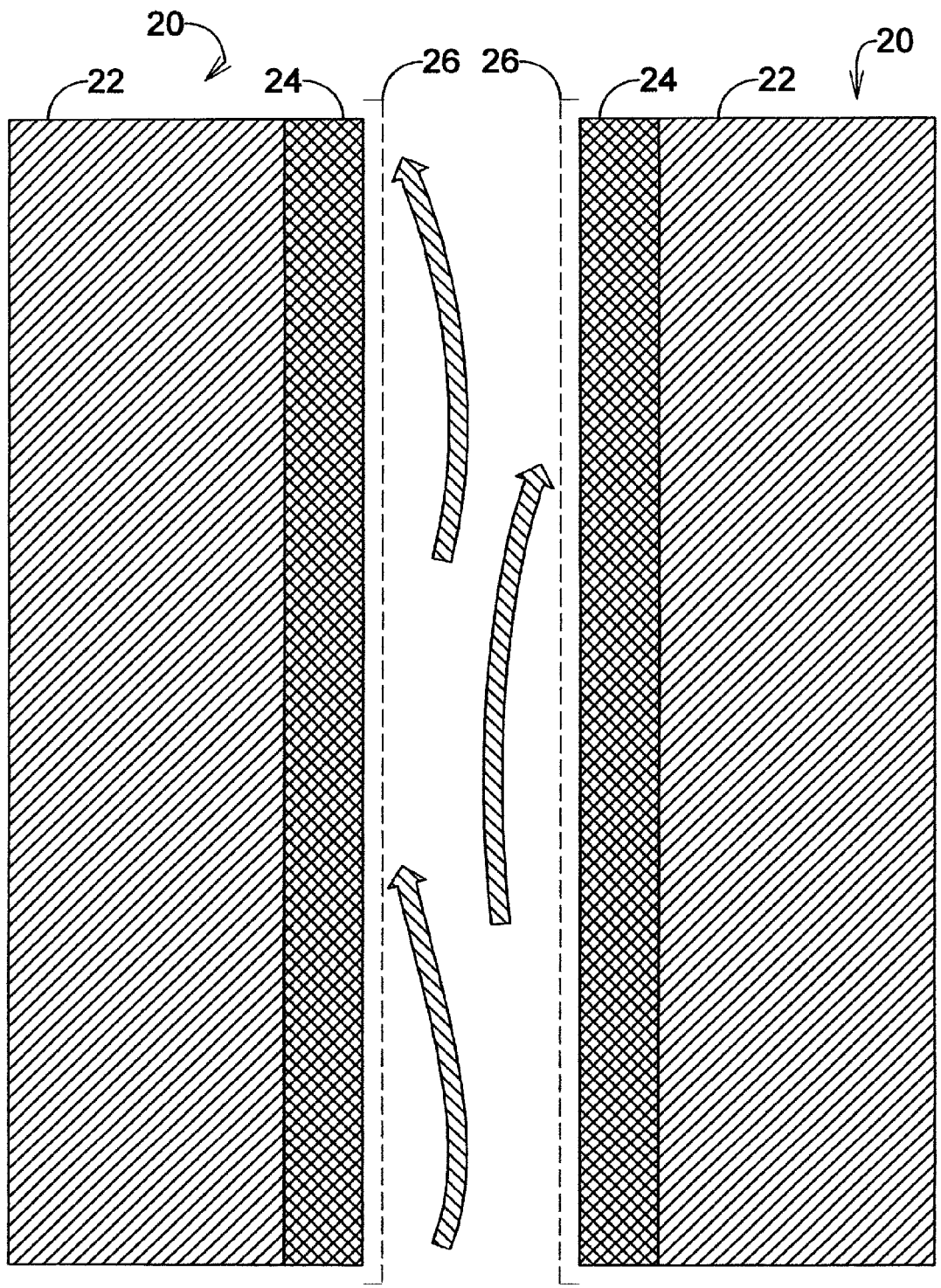
FIG. 19 is a side view of air flowing between insulation boards with an open cell foam facing of the present invention, the insulation boards and open cell foam facing secured by perforated rigid facing.
Figure 20:
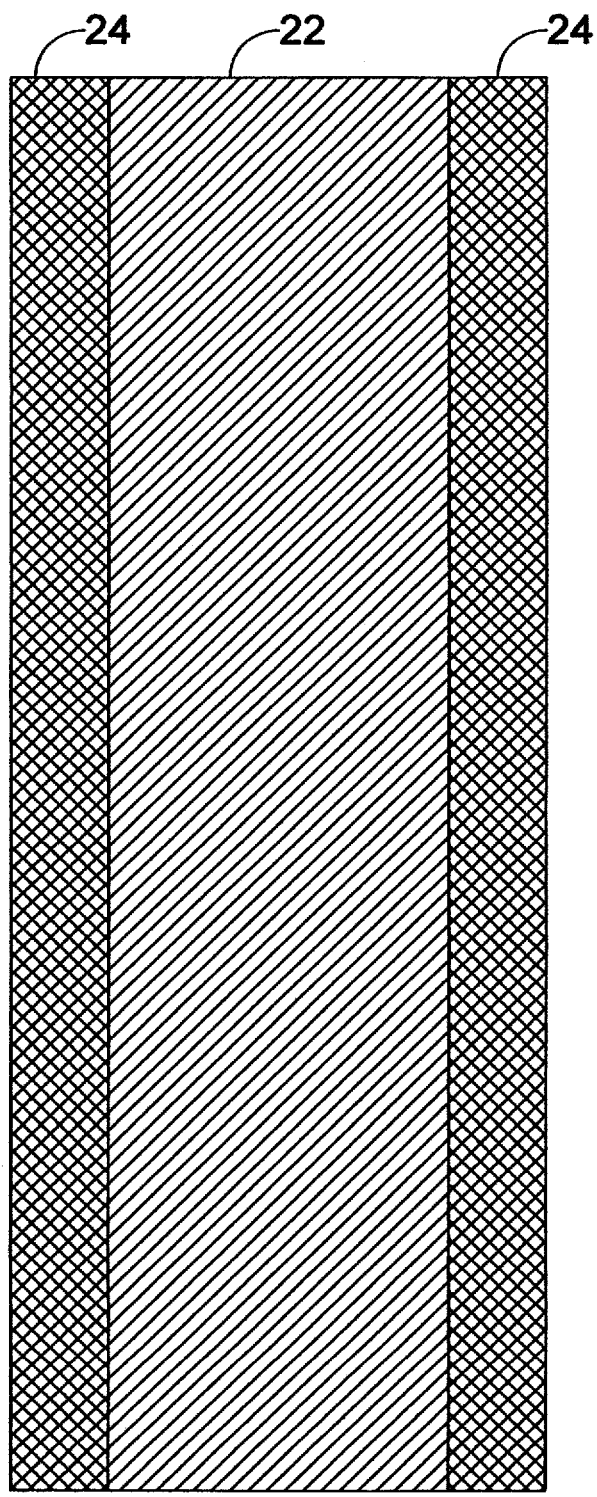
FIG. 20 is a side view of an insulation board with open cell foam facings of the present invention such that the fiberglass therein is enclosed in between the facings.
Figure 21:
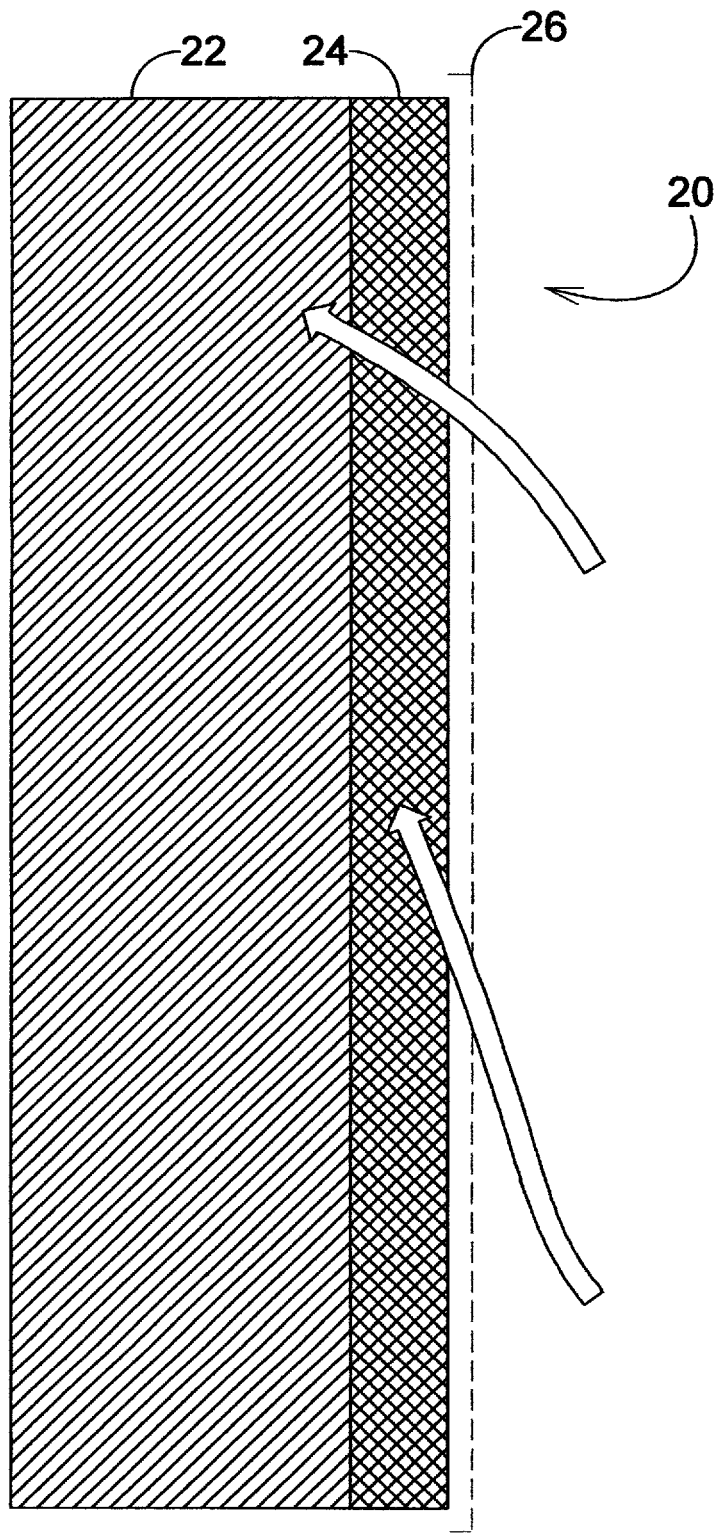
FIG. 21 is a side view of sound being absorbed within an insulation board with an open cell foam facing of the present invention.
Figure 24:
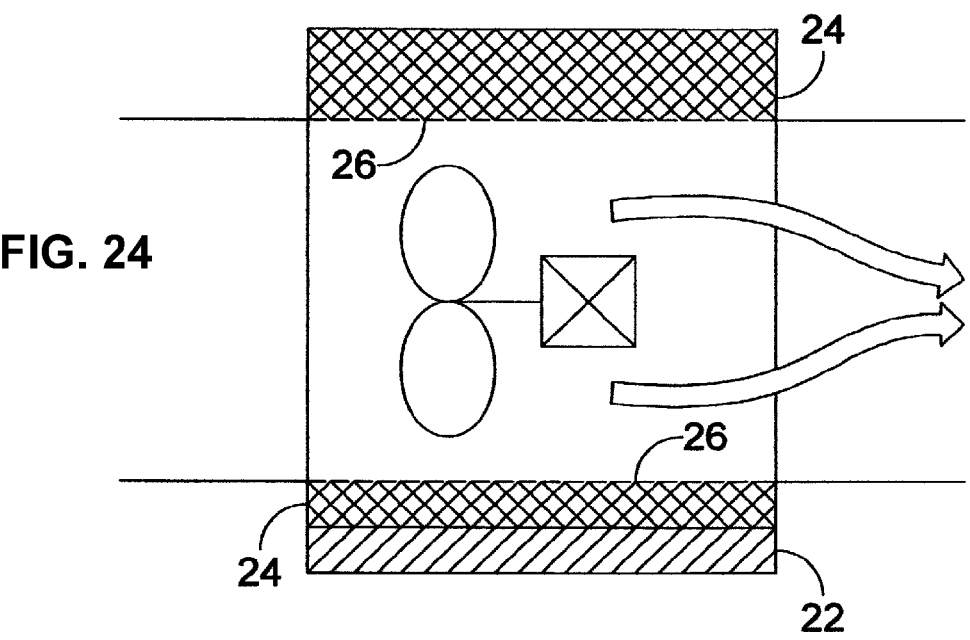
FIG. 24 is a side view of an exemplary air handler having a top section with open cell foam facing secured by perforated rigid facing and a bottom section with layered fiberglass and open cell foam facing secured by perforated rigid facing.
Figure 25:
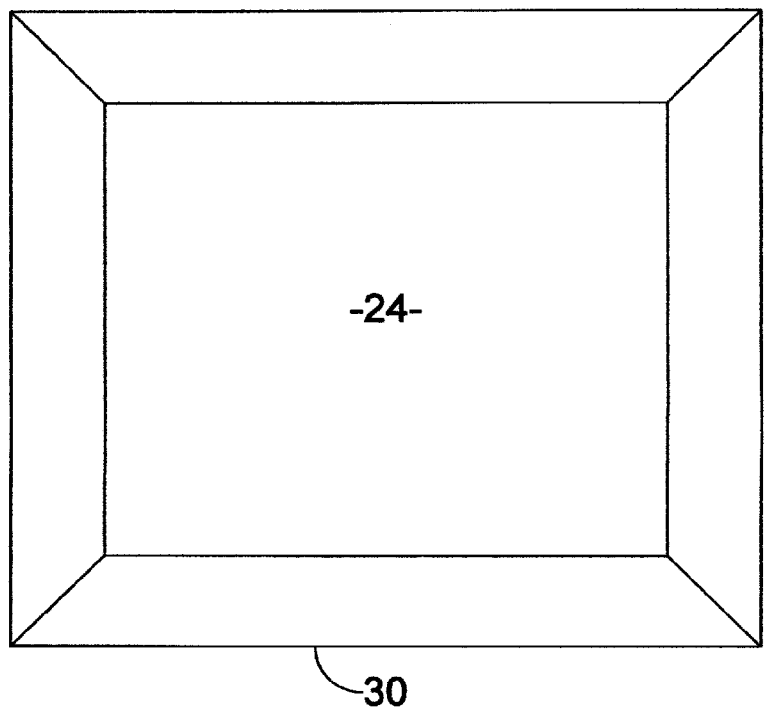
FIG. 25 is a front view of open cell foam facing secured by an exemplary frame.

FIG. 19 shows airflow between the two panels 20 which represent acoustically insulted surfaces and sound attenuation layers. FIGS. 19-21 show a first embodiment in which a fiberglass core 22 has an open cell foam 24 layered with at least one side of the fiberglass core 22. FIGS. 19 and 21-24 show a second embodiment combining the use of open cell foam 24 with for use of perforated rigid facing 26. FIGS. 24 and 25 show a third embodiment in which the entire insulation board 10 is replaced with an uncoated open cell foam pad 22.

Figure 26:
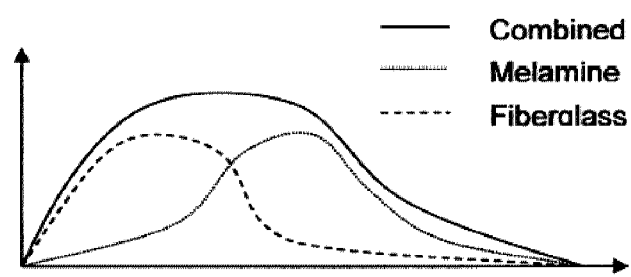
FIG. 26 illustrates a graph with a vertical axis as the absorption coefficient and a horizontal axis showing the frequency.

Turning first to the first embodiment shown in FIGS. 19-21, this layered embodiment includes a fiberglass core 22 (or other type of insulation) that has an open cell foam 24 layered with at least one side of the fiberglass core 22. One advantage to using both the fiberglass material and the open cell foam material is that it is less expensive than using open cell foam material alone because open cell foam more expensive than fiberglass. Another advantage to using both the fiberglass material and the open cell foam material is that it weighs less than using fiberglass material alone because fiberglass weighs more than open cell foam. Another advantage to using both the fiberglass material and the open cell foam material is that is that the two materials provide different types of acoustic insulation over a different range of frequencies. Together, the two materials provide sound absorption over greater range of frequencies. FIG. 26 illustrates a graph with a vertical axis as the absorption coefficient going from 0 to 1 and a horizontal axis showing the frequency going from 0 to 10,000 Htz at approximately the peak point. FIG. 26 is meant to be exemplary and does not necessarily reflect accurate measurements.

Alternative embodiments of the first layered embodiment include a fiberglass core 22 with one side layered with open cell foam 24 (FIG. 19), a fiberglass core 22 with both sides layered with open cell foam 24 (FIG. 20), and a fiberglass core 22 and layered with open cell foam 24 secured by perforated rigid facing 26 (FIG. 21). The bottom section of FIG. 24 shows the embodiment of FIG. 21 in use in an exemplary air handler. It should also be noted that an alternative embodiment of the present invention could include more than two layers of different types of insulation. For example, a four layer version could be open cell foam, fiberglass, rockwool, and open cell foam. The layered embodiment could actually be "tuned" using different types of insulations, different quantities of insulations, and different thicknesses of insulations to have the desired acoustic properties for the intended use.

The present invention also includes a method for making an air handler using the panels and layers. The method includes the steps of providing an air handler system with at least one air handler surface, providing a core of first insulation material having at least one layering surface, and providing a facing of open cell foam second insulation material. Then, the facing is at least partially layered to the at least one layering surface to form a layered insulation board. Finally, the at least one air handler surface is at least partially covered with the layered insulation board so that the facing is exposed to airflow through the air handler.

Figure 22:
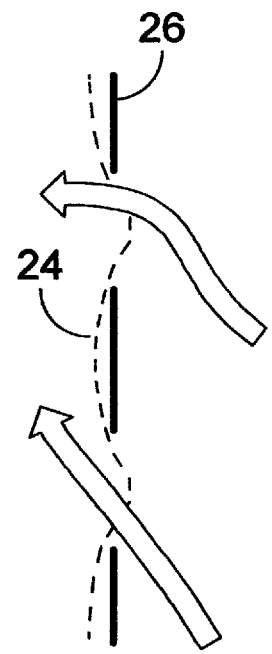
FIG. 22 is an enlarged side view of protruding open cell foam facing formed between the openings in the perforated rigid facing and sound waves being absorbed by the protruding open cell foam facing.
Figure 23:
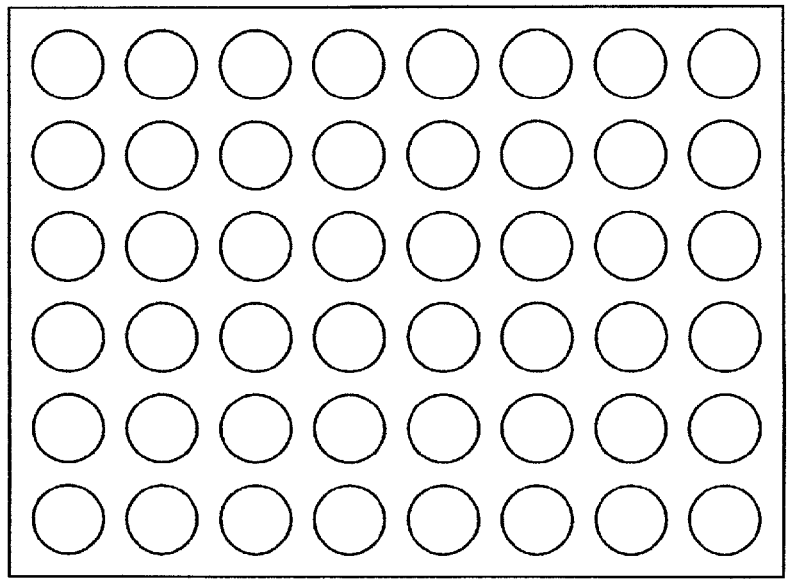
FIG. 23 is a front view of an exemplary perforated rigid facing having circular openings defined therein.

Turning next to the second embodiment shown in FIGS. 19 and 21-24, this perf-secured embodiment combines the use of open cell foam 24 with for use of perforated rigid facing 26. Combining the use of open cell foam and perforated rigid facing 16 provides significant advantages for use in air handlers. For example, the use of the perforated rigid facing 26 to secure the open cell foam 24 does not significantly reduce the sound absorption qualities of the open cell foam 24. As shown in FIG. 22, the open cell structure of the open cell foam 24 allows portions of the open cell foam 24 to protrude from openings defined in the perforated rigid facing 26 (shown in front view in FIG. 23). The exposed open cell foam 24 is able to absorb sound waves. In one embodiment, protruding open cell foam 24 formed between the openings in the perforated rigid facing 26 absorbs sound waves. This can be compared to prior art embodiments in which sound waves are reflected by the substantially rigid diaphragms formed by the smooth facing 14 being divided by the perforated rigid facing 16.

Alternative embodiments of the second perf-secured embodiment include a fiberglass core 22 and layered with open cell foam 24 secured by perforated rigid facing 26 (FIG. 21) and non-layered open cell foam 24 secured by perforated rigid facing 26 (the bottom section of FIG. 24). It should be noted that alternative embodiments may replace perforated rigid facing 26 shown in FIG. 23 with alternative securing structure such as perforated rigid facing 26 with alternatively shaped openings, straps, netting, wire grids, or other securing structure suitable to prevent the open cell foam 24 from being drawn inward.

The present invention also includes a method for making an air handler using the perf-secured embodiment. The method includes the steps of providing an air handler system with at least one air handler surface, providing open cell foam insulation material, and providing securing structure through which said facing may be exposed. Then, the at least one air handler surface is at least partially covered with the open cell foam insulation material. Finally, the open cell foam insulation material is secured to the at least one air handler surface so that the protruding open cell foam insulation material is exposed to sound waves and/or airflow through the air handler.

Turning next to the third preferred embodiment shown in FIGS. 24 and 25, in this uncoated embodiment combines the entire insulation board 10 is replaced with uncoated open cell foam 24. This would be particularly suitable for uses in which the presence of fiberglass would not be satisfactory for the intended use or would be unacceptable to the intended client. For example, pharmaceutical companies involved in ingestible or injectable drugs would find it unacceptable to have any fiberglass in the air handler. Alternative embodiments of the second uncoated embodiment include uncoated open cell foam 24 secured by perforated rigid facing 26 (FIG. 24) uncoated open cell foam 24 secured in a frame 30 (FIG. 25).

The present invention also includes a method for making an air handler using the uncoated third embodiment. The method includes the steps of providing an air handler system with at least one air handler surface and open cell foam. The method also includes the step of covering at least partially the at least one air handler surface with the open cell foam.

The present invention is directed to the use of open cell foam in air handlers that has the necessary durability, safety, and cleanliness properties for the particular use. One exemplary open cell foam, melamine foam (Melamine—Formaldehyde-Polycondensate), has been shown to be quite suitable for this purpose. Melamine is a lightweight, high temperature resistant, open cell foam that has excellent thermal properties with superior sound absorption capabilities. Melamine is cleanable in that it is relatively impervious to chemicals (e.g. it is able to withstand relatively caustic cleaning agents such as SPOR-KLENZ® without breaking down). Melamine also meets the flame spread, smoke density, and fuel contribution requirements necessary to comply with Class-I building code regulations. Because it does not shed particles, it can be used in places where fiberglass would be precluded. Still further, as melamine is inert, it would not cause the health problems (such as those associated with fiberglass) for those who are exposed to the product. It also is relatively attractive. It should be noted that melamine foam has been used as acoustic insulation by such companies as illbruk (www.illbruk-sonex.com). It should be noted that alternative open cell foams could be substituted for melamine. For example, silicone or polyethane foam could be used as the open cell foam of the present invention.

It should be noted that the present invention has been primarily discussed in terms of fiberglass as an alternative type of insulation. It should be noted that other types of insulation may be used in place of fiberglass including, but not limited to rockwool.

Although the embodiments are discussed in terms of layering fiberglass material and the open cell foam material, alternative embodiments could include, bonding the fiberglass material to the open cell foam material, enclosing the fiberglass material within the open cell foam material, coating the fiberglass material with an open cell foam material, and other means for layering the two materials. The term "layers" or "layering" are meant to encompass all of these embodiments as well as others that would be known to those skilled in the art.

It should be noted that the term "air handlers" is meant to include, by way of example, recirculation air handlers, central air handlers, silencer, splitters (such as parallel splitters), clean room ceiling systems, and commercial/industrial air handling systems.

The terms and expressions that have been employed in the foregoing specification are used as terms of description and not of limitation, and are not intended to exclude equivalents of the features shown and described or portions of them. The scope of the invention is defined and limited only by the claims that follow.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

What is claimed is:

1. A fan array fan section in an air-handling system to supply air to a building, comprising:
   an air handling compartment having a discharge plenum configured to deliver air to a ventilation system for at least a portion of the building;
   a fan array of at least three fan units positioned in the air handling compartment, the fan units configured to be ON and OFF, wherein the fan units that are ON have sufficient air flow capacity to at least meet a specified air capacity for at least the portion of the building,
   wherein the air handling compartment includes multiple chambers arranged in an array where at least a portion of the chambers are stacked adjacent one another in at least one row or column, wherein the fan units are positioned in corresponding chambers of the air handling compartment; and
   an array controller programmed to meet a first air demand by operating all of the fan units at a first fan speed and to meet a second air demand by operating a subset of the fan units at the first fan speed.

2. The fan array fan section of claim 1, further comprising sound attenuation layers within the corresponding chambers.

3. The fan array fan section of claim 2, wherein the sound attenuation layers include a perforated facing and at least one layer of insulation material.

4. The fan array fan section of claim 1, wherein the fan units are coupled to motors in a direct drive connection.

5. The fan array fan section of claim 2, wherein the sound attenuation layers extend from front ends to back ends of the corresponding chambers.

6. The fan array fan section of claim 2, wherein the chambers include a top, bottom and sides and the sound attenuation layers are located along, and enclose, the top, bottom and sides of the corresponding chambers.

7. The fan array fan section of claim 2, wherein the sound attenuation layers include sound insulation means for attenuating sound and securing means for preventing the sound insulation means from being drawn into the corresponding chamber.

8. The fan array fan section of claim 2, wherein the fan units are vertically stacked on one another in at least two adjacent columns further comprising a sound attenuation layer positioned between the two adjacent columns of fan units.

9. The fan array fan section of claim 2 wherein at least a portion of the fan units are exposed to one another without the sound attenuation layer there between.

10. The fan array fan section of claim 2, wherein the sound attenuation layers include first and second perforated rigid facings provided along interior surfaces of first and second adjacent chambers, and at least one of a foam layer and a fiberglass layer between the first and second rigid facings.

11. The fan array fan section of claim 1, wherein a spacing between an outer periphery of the fan units in adjacent chambers is between 20% and 60% of a fan wheel diameter.

12. The fan array fan section of claim 1, wherein a spacing between an outer periphery of the fan units in adjacent chambers is between 30% and 60% of a fan wheel diameter.

13. The fan array fan section of claim 1, wherein the fan units constitute plenum fans.

14. The fan array fan section of claim 1, wherein the array controller is programmed to control a speed of said fan units to at least meet a current air demand of at least the portion of the building.

15. The fan array fan section of claim 1, wherein the array controller is configured to run said fan units substantially at or above a selected performance level, wherein the fan units have a preferred operating range, wherein said array controller is configured to operate said at least three fan units substantially at or above the selected performance level when at least one fan unit is OFF by controlling a speed of the remaining fan units to run within said preferred operating range while still meeting the selected performance level.

16. The fan array fan section of claim 15, wherein the selected performance level is based on a criterion selected from the following group of criteria: (a) air flow volume; (b) air pressure; and (c) pattern of air flow.

17. The fan array fan section of claim 1, wherein the array controller is programmed to control a speed of the fan units that are ON.

18. The fan array fan section of claim 1, wherein the array controller is configured to operate the fan units substantially at or above a selected performance level at least by controlling a speed of the fan units that are ON.

19. The fan array fan section of claim 1, wherein the array controller is configured to control the fan units to eliminate surge effects.

20. The fan array fan section of claim 19, where the surge effect occurs when a system pressure is too high for the fan speed at a given volume and the fan units have a tendency to go into stall.

21. The fan array fan section of claim 1, wherein the array controller is configured to adjust a speed of the fan units that are ON to at least meet a current air demand which represents at least a portion of the specified air capacity.

22. The fan array fan section of claim 1, wherein the array controller is configured to receive a user selection to turn individual ones of the fan units ON and OFF.

23. The fan array fan section of claim 1, wherein the array controller is configured to automatically turn individual ones of the fan units ON and OFF.

24. The fan array fan section of claim 1, further comprising a number of the fan units sufficient to provide redundant air flow capacity such that, when at least one of the fan units is OFF, the fan units that are ON have sufficient air flow capacity to at least meet the specified air capacity for at least the portion of the building.

25. The fan array fan section of claim 1, wherein the array controller is configured to turn OFF one or more individual fan units that i) need to be replaced, ii) are not working properly or iii) need maintenance.

26. The fan array fan section of claim 1, wherein the chambers are rectangular.

27. The fan array fan section of claim 1, wherein the chambers are located directly against one another.

28. The fan array fan section of claim 1, wherein the chambers are spaced apart from one another.

29. The fan array fan section of claim 1, wherein the fan units are positioned entirely within the corresponding chambers.

30. The fan array fan section of claim 1, wherein the fan units extend at least partially beyond back ends of the corresponding chambers.

31. A fan array fan section in an air-handling system to supply air to a building, comprising:
   an air handling compartment having a discharge plenum configured to deliver air to a ventilation system for at least a portion of the building;
   a fan array of at least three fan units positioned in the air handling compartment, the fan units configured to be ON and OFF, wherein the fan units that are ON have sufficient air flow capacity to at least meet a specified air capacity for at least the portion of the building,
   wherein the air handling compartment includes multiple chambers arranged in an array where at least a portion of the chambers are stacked adjacent one another in at least one row or column, wherein the fan units are positioned in corresponding chambers of the air handling compartment; and
   an array controller programmed:
   to operate all of the fan units on-line to meet a first air demand of the building; and
   to take at least one of the fan units off-line, while operating at least a portion of the fan units on-line, to meet a second air demand of the building, wherein the fan units that are on-line are operated at a same speed when meeting both the first and second air demands.

32. A method for providing a fan array fan section in an air-handling system to supply air to a building, comprising:
   providing an air handling compartment having a discharge plenum configured to deliver air to a ventilation system for at least a portion of the building;

providing a fan array of fan units, wherein the fan units that are on-line have sufficient air flow capacity to at least meet a specified air capacity for at least the portion of the building;

operating all of the fan units, as a full-array-on-line set, to meet a first air demand of the building;

while at least one of the fan units is removed or off-line, operating a sub-set of the fan units, as a partial-array-on-line sub-set, to meet a second air demand of the building, where active fan units in the full-array-on-line set and partial-array-on-line sub-set are operated at a common speed; and automatically taking off-line and on-line individual fan units.

33. A method for providing a fan array fan section in an air-handling system to supply air to a building, comprising:

providing an air handling compartment having a discharge plenum configured to deliver air to a ventilation system for at least a portion of the building;

providing a fan array of fan units, wherein, the fan units that are on-line have sufficient air flow capacity to at least meet a specified air capacity for at least the portion of the building;

operating all of the fan units, as a full-array-on-line set, to meet a first air demand of the building; and while at least one of the fan units is removed or off-line, operating a sub-set of the fan units, as a partial-array-on-line sub-set, to meet a second air demand of the building, where active fan units in the full-array-on-line set and partial-array-on-line sub-set are operated at a common speed.

34. The method of claim 33, further comprising: adjusting a speed of the full-array-on-line set and the partial-array-on-line sub-set to meet the first and second air demands, respectively.

35. The method of claim 33, further comprising manually taking off-line and on-line individual fan units.

36. The method of claim 33, further comprising turning OFF a disabled fan unit from the partial-array-on-line fan unit sub-set and turning ON the at least one fan unit that was removed or off-line.

37. The method of claim 33, further comprising turning ON only a number of the fan units required to meet a current air demand without a need for a variable frequency drive controller.

38. The method of claim 33, further comprising positioning sound attenuation layers between at least a portion of adjacent fan units.

39. The method of claim 38, wherein the sound attenuation layers are provided along at least one of a top, bottom, and side of the fan units.

40. The method of claim 38, wherein the sound attenuation layers each include a perforated facing and at least one layer of insulation material.

41. The method of claim 38, wherein the sound attenuation layers include first and second perforated rigid facings provided along interior surfaces of first and second adjacent chambers, and at least one of a foam layer and a fiberglass layer between the first and second rigid facings.

42. The method of claim 33, wherein the fan units are coupled to motors in a direct drive connection.

43. A method for providing a fan array fan section in an air-handling system to supply air to a building, the method comprising:

providing an air handling compartment having a discharge plenum configured to deliver air to a ventilation system for at least a portion of the building;

providing a fan array of fan units positioned in the air handling compartment, the fan units configured to be ON and OFF, wherein the fan units that are ON have sufficient air flow capacity to at least meet a specified air capacity for at least the portion of the building;

including multiple chambers, in the air handling compartment, arranged in an array where at least a portion of the chambers are stacked adjacent one another in at least one row or column;

positioning the fan units in corresponding chambers of the air handling compartment; and configuring an array controller to meet a first air demand by operating all of the fan units at a first fan speed and to meet a second air demand by operating a subset of the fan units at the first fan speed.

44. The method of claim 43, further comprising configuring the array controller to control a speed of the fan units that are ON.

45. The method of claim 43, further comprising configuring the array controller to operate the fan units substantially at or above a selected performance level at least by controlling a speed of the fan units that are ON.

46. The method of claim 43, further comprising configuring the array controller to control the fan units to eliminate surge effects.

47. The method of claim 46, where the surge effect occurs when a system pressure is too high for the fan speed at a given volume and the fan units have a tendency to go into stall.

48. The method of claim 43, further comprising adjusting a speed of the fan units that are ON to at least meet a current air demand which represents at least a portion of the specified air capacity.

49. The method of claim 43, further comprising manually controlling the array controller to turn individual ones of the fan units ON and OFF.

50. The method of claim 43, further comprising configuring the array controller to automatically turn individual ones of the fan units ON and OFF.

51. The method of claim 43, further comprising providing a number of the fan units sufficient to provide redundant air flow capacity such that, when at least one of the fan units is OFF, the fan units that are ON have sufficient air flow capacity to at least meet the specified air capacity for at least the portion of the building.

52. The method of claim 43, further comprising turning OFF one or more individual fan units that i) need to be replaced, ii) are not working properly or iii) need maintenance.

* * * * *